United States Patent
Jeong et al.

(10) Patent No.: US 11,200,171 B2
(45) Date of Patent: Dec. 14, 2021

(54) MEMORY SYSTEMS HAVING A CACHE SYSTEM AND A HOST CONTROLLER HAVING A HOST QUEUE

(71) Applicant: SK hynix Inc., Icheon-si (KR)

(72) Inventors: Seung Gyu Jeong, Gwangmyeong-si (KR); Jin Woong Suh, Icheon-si (KR); Jung Hyun Kwon, Seoul (KR)

(73) Assignee: SK hynix Inc., Icheon-si (KR)

(*) Notice: Subject to any disclaimer, the term of this patent is extended or adjusted under 35 U.S.C. 154(b) by 124 days.

(21) Appl. No.: 16/664,095

(22) Filed: Oct. 25, 2019

(65) Prior Publication Data
US 2020/0151103 A1 May 14, 2020

(30) Foreign Application Priority Data
Nov. 14, 2018 (KR) .................. 10-2018-0140299

(51) Int. Cl.
*G06F 12/0864* (2016.01)
*G06F 13/16* (2006.01)
(52) U.S. Cl.
CPC ...... *G06F 12/0864* (2013.01); *G06F 13/1668* (2013.01); *G06F 2212/608* (2013.01)
(58) Field of Classification Search
CPC ............. G06F 12/0864; G06F 13/1668; G06F 2212/608; G06F 3/0613; G06F 3/0659; G06F 3/0656; G06F 3/0671; G06F 12/0888; G06F 2212/312; G06F 12/0871; G06F 12/0868
USPC .................................. 711/144, 128
See application file for complete search history.

(56) References Cited

U.S. PATENT DOCUMENTS

| 5,392,436 A | * | 2/1995 | Jansen | G06F 13/362 370/462 |
| 6,490,660 B1 | * | 12/2002 | Gilda | G06F 12/0811 711/118 |
| 2011/0320722 A1 | * | 12/2011 | Dunn Berger | G06F 12/084 711/125 |
| 2018/0039447 A1 | * | 2/2018 | Lee | G06F 3/0652 |
| 2019/0188134 A1 | * | 6/2019 | Jeong | G11C 29/52 |
| 2020/0125261 A1 | * | 4/2020 | Byun | G06F 12/0815 |

FOREIGN PATENT DOCUMENTS

KR 1020140116495 A 10/2014

OTHER PUBLICATIONS

Jim Handy, The Cache Memory Book, second Edition, Academic Press, INC., 1998, pp. 1-229 (Year: 1998).*

* cited by examiner

*Primary Examiner* — Hong C Kim
(74) *Attorney, Agent, or Firm* — William Park & Associates Ltd.

(57) ABSTRACT

A memory system includes a host controller and a cache system. The host controller includes a host queue in which host data including a command outputted from a host are stored. The cache system includes a cache memory having a plurality of sets and a cache controller controlling an operation of the cache memory. The cache controller transmits status information on a certain set to which the host data are to be transmitted among the plurality of sets to the host controller. The host controller receives the status information from the cache controller to determine transmission or non-transmission of the host data stored in the host queue to the cache system.

18 Claims, 18 Drawing Sheets

FIG.4

| | queue storage-3 | queue storage-2 | queue storage-1 | queue storage-0 |
|---|---|---|---|---|
| command | cmd-3 (write) | cmd-2 (write) | cmd-1 (write) | cmd-0 (write) |
| set address | set_addr_3 (set=3) | set_addr_2 (set=2) | set_addr_1 (set=1) | set_addr_0 (set=0) |
| data | data-3 | data-2 | data-1 | data-0 |

112

MEMORY SYSTEMS HAVING A CACHE SYSTEM AND A HOST CONTROLLER HAVING A HOST QUEUE

CROSS-REFERENCE TO RELATED APPLICATIONS

The present application claims priority under 35 U.S.C. § 119(a) to Korean Application No. 10-2018-0140299, filed on Nov. 14, 2018, which is incorporated herein by reference in its entirety.

BACKGROUND

1. Technical Field

Various embodiments of the present disclosure relate to memory systems and, more particularly, to memory systems having a cache system and methods of controlling a caching operation in the memory systems.

2. Related Art

In memory systems, a memory generally operates at a relatively low speed as compared with a host, such as a central processing unit (CPU). Thus, a cache system including a cache memory has been widely employed in most of the memory systems to solve problems which are due to a speed difference between the host and the memory. The cache system may be disposed between the host (or a host controller) and the memory or may be disposed in a memory controller between the host and the memory. If the memory system employs a fully associative cache architecture, an empty block in a set of the cache memory may be used in data transmission even though all of blocks constituting another set in the cache memory are filled with data. In contrast, if the memory system employs a set associative cache architecture and all of blocks constituting a certain set in the cache memory are filled with data, data transmission from the host toward the cache memory may be interrupted until the data stored any one of the blocks included in the certain set are removed. This may lead to degradation of the performance of the memory system.

SUMMARY

In accordance with an embodiment of the present disclosure, a memory system includes a host controller including a host queue, wherein the host queue is configured to store host data received from a host, and wherein the host data includes commands. The memory system also includes a cache system including a cache memory and a cache controller, wherein the cache controller is configured to control an operation of the cache memory, and wherein the cache memory comprises a plurality of sets. The cache controller is further configured to transmit, to the host controller, first status information on a first set, of the plurality of sets, to which first host data, of the host data, are to be transmitted. The host controller is configured to receive the first status information from the cache controller and to determine, based on the first status information, whether to transmit the first host data stored in the host queue to the cache system.

In accordance with another embodiment of the present disclosure, a memory system includes a host, a memory, and a memory controller coupled between the host and the memory to control an operation of the memory. The memory controller includes a host queue configured to store host data including a command outputted from the host, a host queue managing logic unit configured to control an operation for transmitting the host data stored in the host queue, and a cache system including a cache memory having a plurality of sets and a cache controller controlling an operation of the cache memory. The cache controller transmits status information on a certain set to which the host data are to be transmitted among the plurality of sets to the host queue managing logic unit. The host queue managing logic unit receives the status information from the cache controller to determine whether to transmit the host data stored in the host queue to the cache system.

In accordance with a further embodiment of the present disclosure, a method of controlling a caching operation in a memory system including a host queue configured to store host data including a command outputted from a host and a cache memory including a plurality of sets. The cache memory, having a set associative cache architecture, further includes a plurality of ways, wherein each way of the plurality of ways comprises a plurality of blocks, wherein each set of the plurality of sets comprises a single block from each way. The method includes providing status information on a certain set to which the host data are to be transmitted among the plurality of sets constituting the cache memory and determining transmission or non-transmission of the host data stored in the host queue to the cache memory according to the status information.

BRIEF DESCRIPTION OF THE DRAWINGS

Certain features of the disclosed technology are illustrated by various embodiments with reference to the attached drawings, in which:

FIG. 4 is a schematic view illustrating an example of a host queue in which host data are stored during an operation of the memory system shown in FIG. 1;

DETAILED DESCRIPTION OF THE EMBODIMENTS

In the following description of the embodiments, it will be understood that the terms "first" and "second" are intended to distinguish between similar elements, but not used to imply a particular number or sequence of elements. In addition, when an element is referred to as being located "on", "over", "above", "under", or "beneath" another element, it is intended to mean relative position relationship, but not used to limit certain cases that the element directly contacts the other element, or at least one intervening element is present therebetween. Accordingly, the terms such as "on", "over", "above", "under", "beneath", "below", and the like that are used herein are for the purpose of describing particular embodiments only and are not intended to limit the scope of the present disclosure. Further, when an element is referred to as being "connected" or "coupled" to another element, the element may be electrically or mechanically connected or coupled to the other element directly, or may form a connection relationship or coupling relationship by replacing the other element therebetween.

Various embodiments are directed to memory systems having a cache system and methods of controlling a caching operation in the memory systems.

Figure 1:
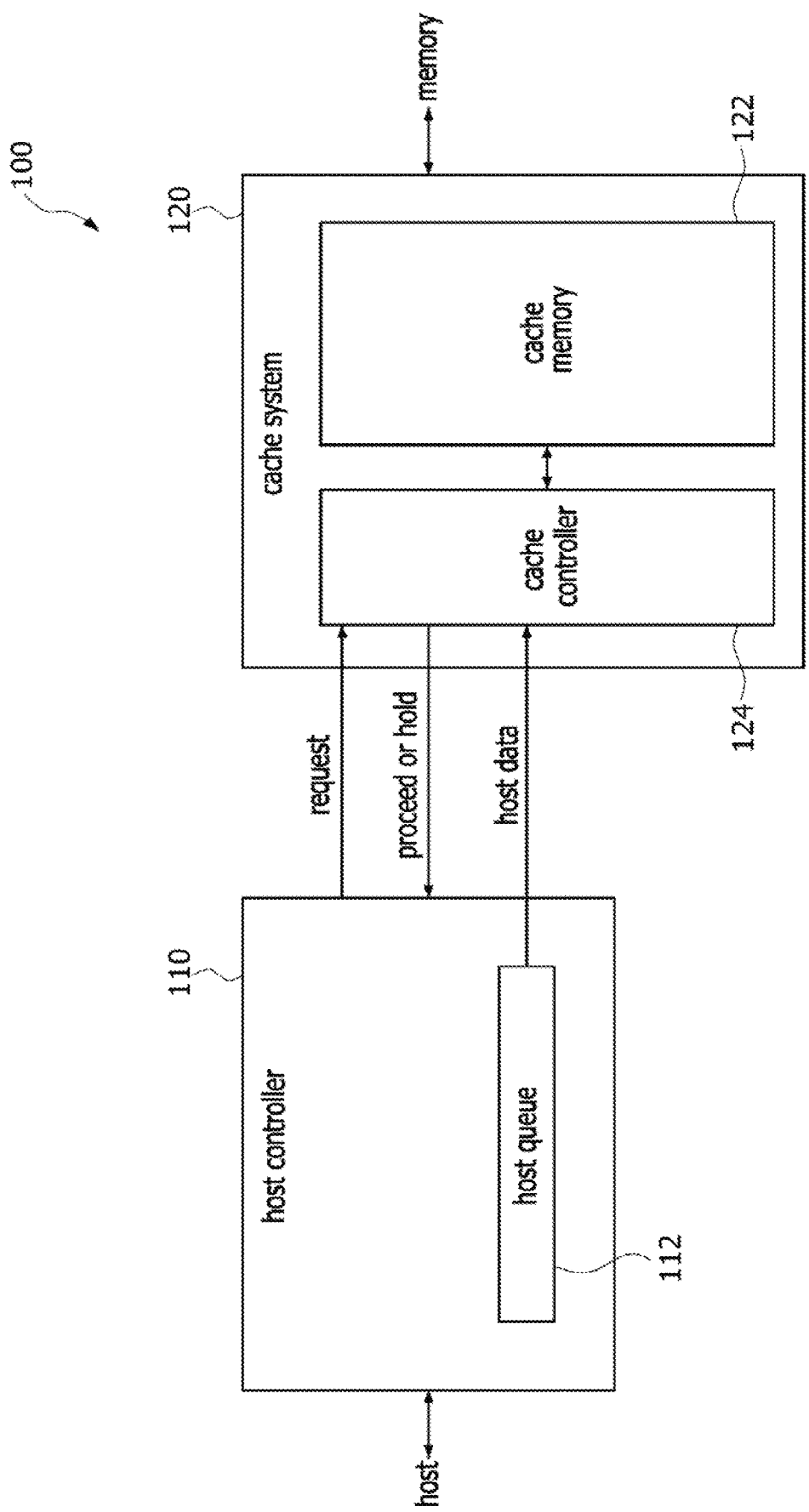
FIG. 1 is a block diagram illustrating a memory system according to an embodiment of the present disclosure.

FIG. 1 is a block diagram illustrating a memory system 100 according to an embodiment of the present disclosure. Referring to FIG. 1, the memory system 100 may be configured to include a host, a host controller 110, a cache system 120, and a memory. The host controller 110 may receive host data from the host and may transmit the host data to the cache system 120. The host controller 110 may include a host queue 112, and the cache system 120 may include a cache memory 122 and a cache controller 124. The host data outputted from the host may be stored into the host queue 112. In an embodiment, the host data may include a write command for performing a write operation of the memory, write data, and a set address in the cache memory 122 where the write data are written. In such a case, the set address may include information on an address of the memory where the write data are written. In addition, the host data may include a read command for performing a read operation of the memory and a set address in the cache memory 122 where read data are stored. In such a case, the set address may include information on an address of the memory where the read data are stored. The host queue 112 may have a plurality of storage elements. Each of the plurality of storage elements of the host queue 112 may store a unit of host data. The host controller 110 may store the host data sequentially outputted from the host into respective ones of the plurality of storage elements of the host queue 112 in the same sequence as outputted from the host. In a host data transmission mode, if all of the storage elements in the host queue 112 are filled with the host data, the host controller 110 may transmit the host data to the cache system 120 in the same sequence as stored into the host queue 112.

As described above, the cache system 120 may be configured to include the cache memory 122 and the cache controller 124. The cache controller 124 may control an operation of the cache memory 122. Specifically, the cache controller 124 may control an operation for storing the write data into the cache memory 122 and an operation for transmitting the stored write data to the memory in response to a write request outputted from the host. In addition, the cache controller 124 may control an operation for storing the read data outputted from the memory into the cache memory 122 and an operation for transmitting the stored read data to the host in response to a read request outputted from the host. The cache controller 124 may communicate with the host controller 110 to control the operations of the cache memory 122.

In the memory system 100, the host controller 110 may transmit a request signal to the cache controller 124 of the cache system 120 in the host data transmission mode. The request signal may include information on an address of the host data that are currently standing by to be transmitted. The cache controller 124 may discriminate whether a caching operation for a cache storage region in the cache memory 122 corresponding to the address information transmitted according to the status of the cache memory 122 is available in response to the request signal and may transmit one of a proceed signal and a hold signal to the host controller 110 according to the discrimination result. The proceed signal may be generated if the caching operation for the cache memory 122 is available, and the hold signal may be generated if the caching operation for the cache memory 122 is unavailable.

The host controller 110 may transmit the host data to the cache controller 124 or not in response to the proceed signal or the hold signal which is outputted from the cache controller 124 of the cache system 120. If the proceed signal is outputted from the cache controller 124, the host controller 110 may transmit host data currently on standby among the host data stored in the host queue 112 to the cache controller 124. If the hold signal is outputted from the cache controller 124, the host controller 110 may continuously put the host data currently on standby in a standby status.

Figure 2:
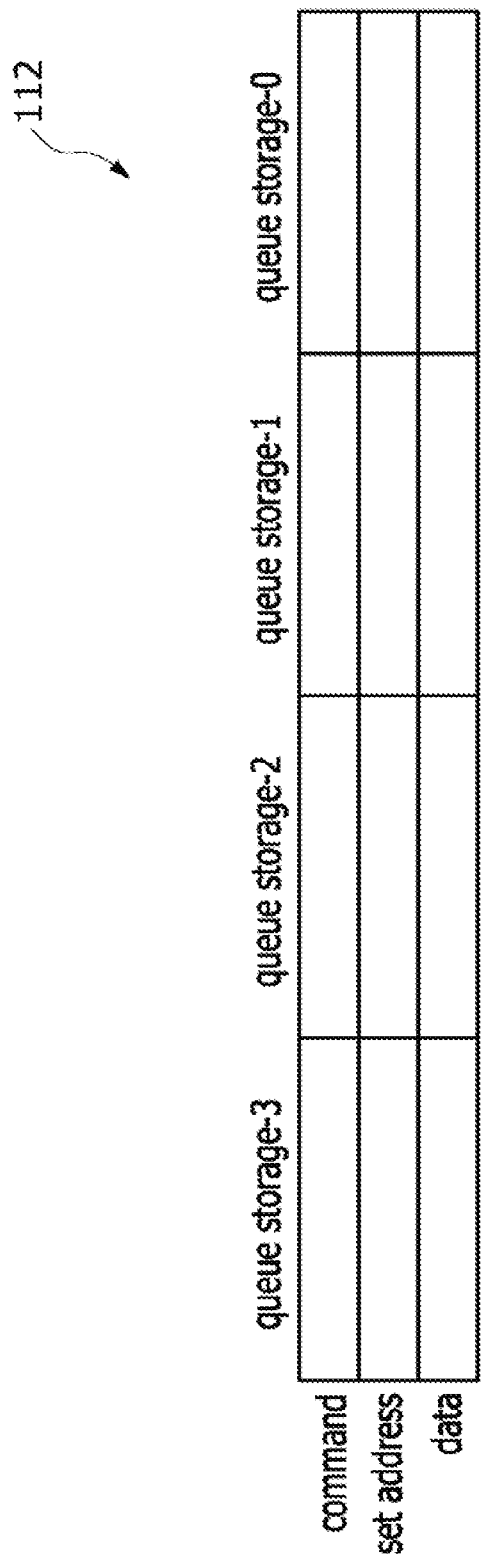
FIG. 2 is a schematic view illustrating an example of a host queue included in the memory system of FIG. 1.

FIG. 2 is a schematic view illustrating an example of the host queue 112 included in the memory system 100 of FIG. 1. Referring to FIG. 2, the host queue 112 may have a plurality of queue storage elements, for example, four queue storage elements (i.e., first to fourth queue storage elements QUEUE_STORAGE-0, QUEUE_STORAGE-1, QUEUE_STORAGE-2, QUEUE_STORAGE-3). Each of the first to fourth queue storage elements QUEUE_STORAGE-0, QUEUE_STORAGE-1, QUEUE_STORAGE-2, QUEUE_STORAGE-3 may have storage regions in which a command, a set address and data constituting one set of host data are respectively stored. The command may include a read command or a write command. The set address may include information on an address of the memory where the write data are written or the read data are stored. In an embodiment, if the host firstly outputs the host data, the host data may be firstly stored into the first queue storage element QUEUE_STORAGE-0. The host data secondly outputted from the host may be stored into the second queue storage element QUEUE_STORAGE-1. Similarly, the host data thirdly outputted from the host may be stored into the third queue storage element QUEUE_STORAGE-2, and the host data fourthly outputted from the host may be stored into the fourth queue storage element QUEUE_STORAGE-3. If all of the first to fourth queue storage elements QUEUE_STORAGE-0, QUEUE_STORAGE-1, QUEUE_STORAGE-2 and QUEUE_STORAGE-3 are filled with the host data, the host controller 110 may operate in the host data transmission mode.

Figure 3:
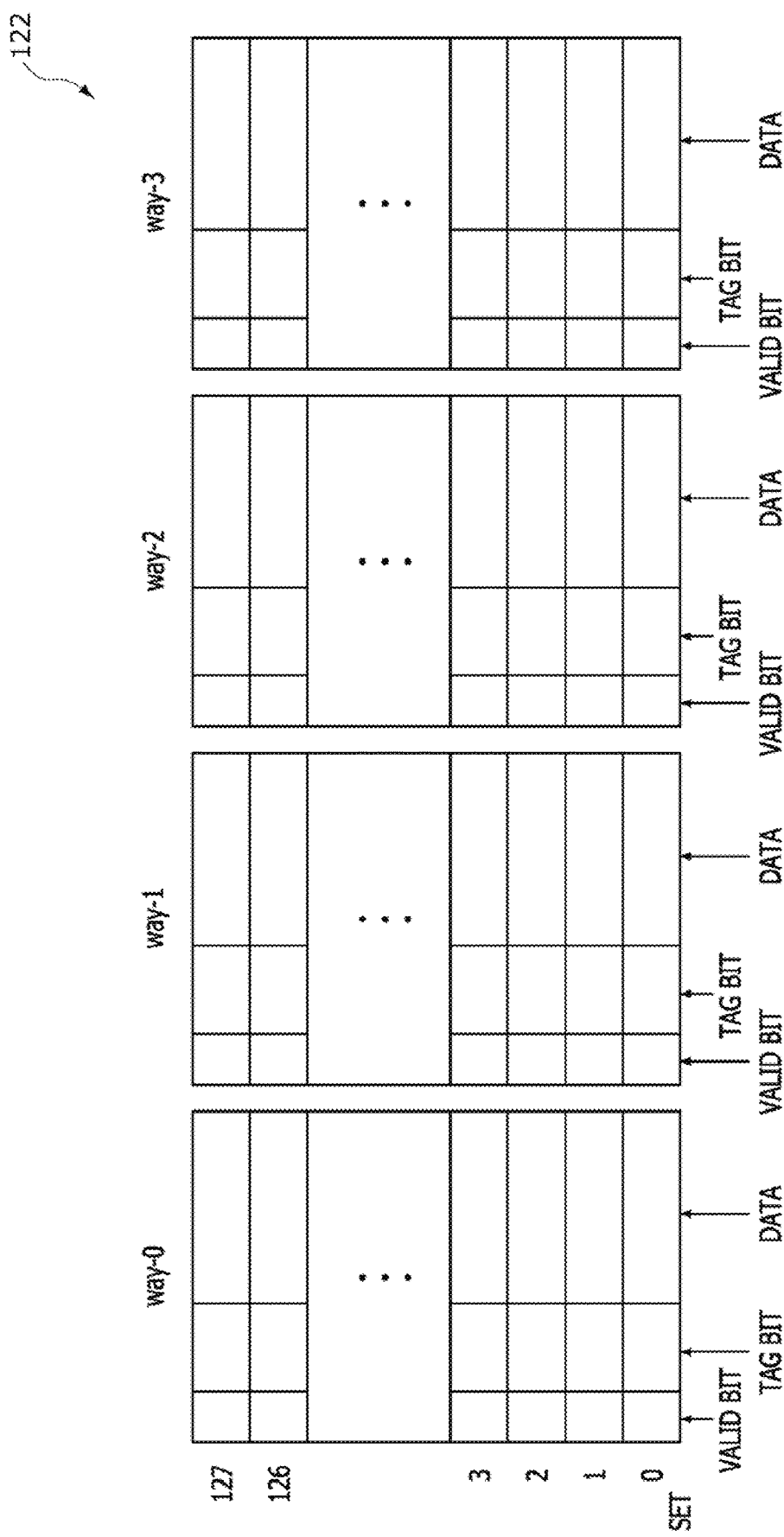
FIG. 3 is a schematic view illustrating an example of a cache memory included in the memory system of FIG. 1.

FIG. 3 is a schematic view illustrating an example of the cache memory 122 included in the memory system 100 of FIG. 1. Referring to FIG. 3, the cache memory 122 may be configured to have a set associative cache architecture. Specifically, the cache memory 122 may have a plurality of ways, for example, four ways (i.e., first to fourth ways WAY-0, WAY-1, WAY-2 and WAY-3). Each of the first to fourth ways WAY-0, WAY-1, WAY-2 and WAY-3 may have a plurality of blocks, for example, 128 blocks (i.e., first to one hundred twenty eighth blocks). A valid bit, a tag bit and data may be stored in each of the first to one hundred twenty eighth blocks. Although not shown in the drawings, each block may further store a dirty bit notifying or informing of the existence of a dirty line. Any one of the first to $128^{th}$ blocks in each of the ways WAY-0, WAY-1, WAY-2 and WAY-3 may belong to one set. For example, the first blocks of the first to fourth ways WAY-0, WAY-1, WAY-2 and WAY-3 may constitute a first set SET_0, and the second blocks of the first to fourth ways WAY-0, WAY-1, WAY-2 and WAY-3 may constitute a second set SET_1. Similarly, the $128^{th}$ blocks of the first to fourth ways WAY-0, WAY-1, WAY-2 and WAY-3 may constitute a $128^{th}$ set SET_127. The set may be referred to as a cache line or an index.

Figure 5:
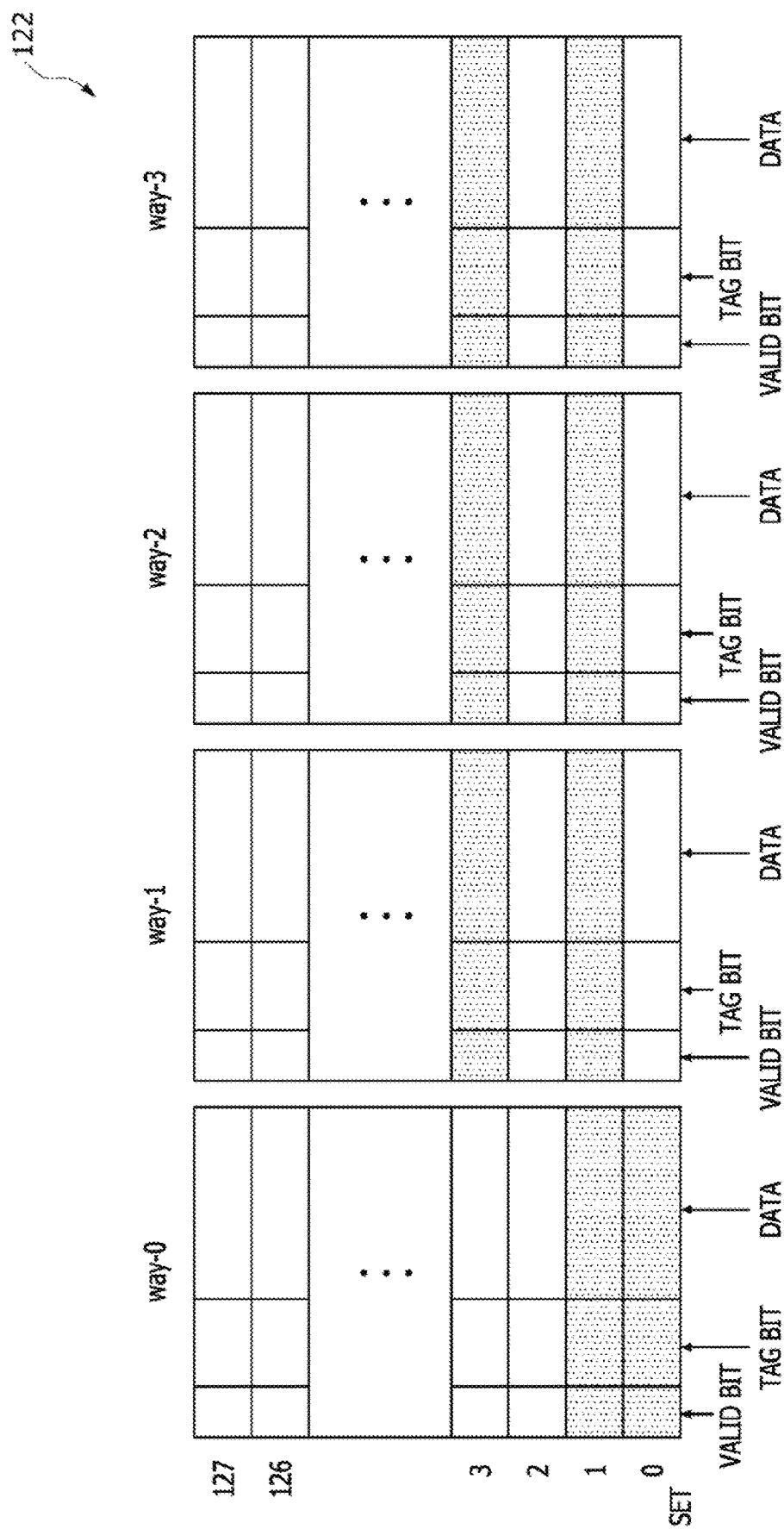
FIG. 5 is a schematic view illustrating an example of a cache memory having a set including a plurality of blocks, all of which are filled with data during an operation of the memory system shown in FIG. 1.

FIG. 4 is a schematic view illustrating an example of the host queue 112 in which the host data are stored during an operation of the memory system 100 shown in FIG. 1. FIG. 5 is a schematic view illustrating an example of the cache memory 122 having sets SET_0-SET_127 including a plurality of blocks, all of which are filled with data during an operation of the memory system 100 shown in FIG. 1. First, as illustrated in FIG. 4, a first write command CMD-0 (write) as a first command, a first set address SET_ADDR_0 corresponding to an address of a first set SET=0, and first write data DATA-0 may be stored in the first queue storage element QUEUE_STORAGE-0. In addition, a second write command CMD-1 (write) as a second command, a second set address SET_ADDR_1 corresponding to an address of a second set SET=1, and second write data DATA-1 may be stored in the second queue storage element QUEUE_STORAGE-1. Moreover, a third write command CMD-2 (write) as a third command, a third set address SET_ADDR_2 corresponding to an address of a third set SET=2, and third write data DATA-2 may be stored in the third queue storage element QUEUE_STORAGE-2. Furthermore, a fourth write command CMD-3 (write) as a fourth command, a fourth set address SET_ADDR_3 corresponding to an address of a fourth set SET=3, and fourth write data DATA-3 may be stored in the fourth queue storage element QUEUE_STORAGE-3.

Next, as illustrated in FIG. 5, in the case of the first set SET=0 of the cache memory 122, only the first block of the first way WAY-0 may be filled with the data and all of the first blocks of the second to fourth ways WAY-1, WAY-2 and WAY-3 may be empty without the data. In the case of the second set SET=1 of the cache memory 122, all of the second blocks of the first to fourth ways WAY-0, WAY-1, WAY-2 and WAY-3 may be filled with the data. In the case of the third set SET=2 of the cache memory 122, all of the third blocks of the first to fourth ways WAY-0, WAY-1, WAY-2 and WAY-3 may be empty without the data. In the case of the fourth set SET=3 of the cache memory 122, only the fourth block of the first way WAY-0 is empty and all of the fourth blocks of the second to fourth ways WAY-1, WAY-2 and WAY-3 may be filled with the data.

In the following embodiments, a status that the caching operation for any one of the sets constituting the cache memory 122 is available may be referred as a cache available status. The cache available status may mean a status that all of the blocks in one set are filled with the data. On the contrary, a status that the caching operation for any one of the sets constituting the cache memory 122 is unavailable may be referred as a cache full status. The cache full status may mean a status that all of the blocks in one set are not filled with the data. However, the above assumption may be merely an example of the present disclosure. That is, the availability of the caching operation for any one of the sets constituting the cache memory 122 may be defined to be different according to the embodiments.

Referring to FIGS. 1, 4 and 5, in the host data transmission mode, the host data stored in the first to fourth queue storage elements QUEUE_STORAGE-0, QUEUE_STORAGE-1, QUEUE_STORAGE-2, QUEUE_STORAGE-3 may be sequentially transmitted to the cache memory 122. However, in the case of a general memory system, all of the host data stored in the host queue 112 are not transmitted to the cache system 120 because all of the blocks in the second set (SET=1) allocated by the second queue storage element QUEUE_STORAGE-1 among the first to fourth sets SET=0, SET=1, SET=2 and SET=3 are already filled with the data to provide a set full status. In contrast, according to the present embodiment, the host controller 110 may transmit a request signal including the first set address SET_ADDR_0 stored in the first queue storage element QUEUE_STORAGE-0, which is firstly transmitted among the host data which are stored in the first to fourth queue storage elements QUEUE_STORAGE-0, QUEUE_STORAGE-1, QUEUE_STORAGE-2, and QUEUE_STORAGE-3, to the cache controller 124 of the cache system 120. The cache controller 124 may recognize a status of the first set SET=0 in the cache memory 122 based on the first set address SET_ADDR_0 transmitted from the host controller 110 to the cache controller 124. As illustrated in FIG. 5, because all of the blocks belonging to the second to fourth ways WAY-1, WAY-2 and WAY-3 among the blocks of the first set SET=0 are empty, the cache controller 124 may transmit the proceed signal indicating the availability of the caching operation for the first set SET=0 of the cache memory 122 to the host controller 110. The host controller 110 may receive the proceed signal from the cache controller 124 to store the first host data stored in the first queue storage element QUEUE_STORAGE-0 into the first block (an empty block) belonging to any one of the second to fourth ways WAY-1, WAY-2 and WAY-3 among the blocks in the first set SET=0 of the cache memory 122 through the cache controller 124. The way in which the first host data are stored may be selected according to the information on an address of the memory, which is included in the host data (i.e., the first host data).

After the first host data are transmitted to the cache memory 122, the host controller 110 may transmit a request signal including the second set address SET_ADDR_1 stored in the second queue storage element QUEUE_STORAGE-1 to the cache memory 124 of the cache system 120. The cache memory 124 may recognize a status of the second set SET=1 in the cache memory 122 based on the second set address SET_ADDR_1 transmitted from the host controller 110 to the cache controller 124. As illustrated in FIG. 5, because all of the blocks belonging to all of the first to fourth ways WAY-0, WAY-1, WAY-2 and WAY-3 among the blocks of the second set SET=1 are filled with the data to provide the set full status, the cache controller 124 may transmit the hold signal for holding the caching operation for the second set SET=1 of the cache memory 122 to the host controller 110. The host controller 110 may receive the hold signal from the cache controller 124 to interrupt a transmission operation for the second host data stored in the second queue storage element QUEUE_STORAGE-1.

As described above, the memory system 100 according to an embodiment may transmit the host data to the cache memory 122 until a set included in the cache memory 122 to which a portion of host data currently on standby is transmitted is verified as having a set full status.

Figure 6:
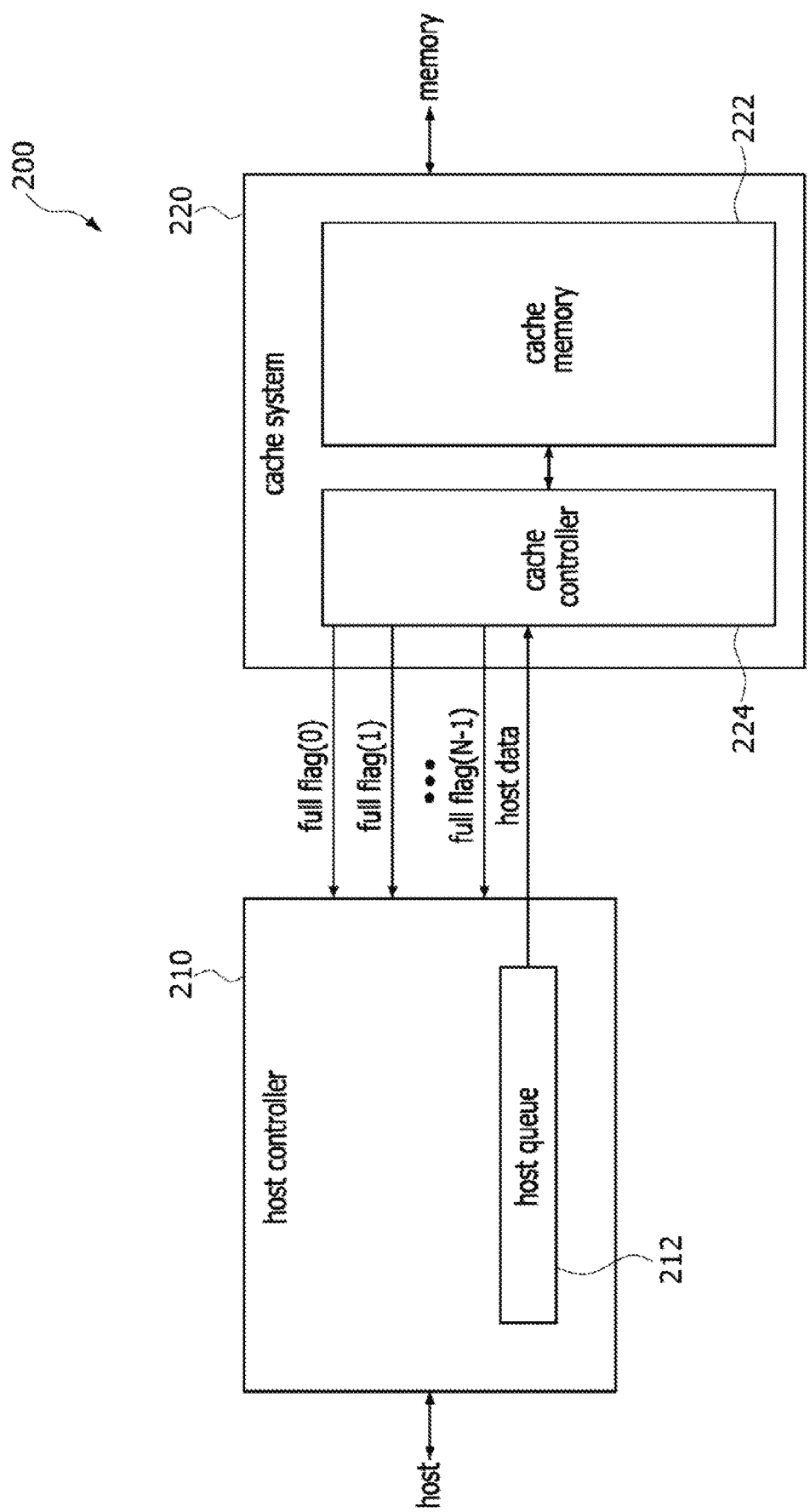
FIG. 6 is a block diagram illustrating a memory system according to another embodiment of the present disclosure.

FIG. 6 is a block diagram illustrating a memory system 200 according to another embodiment of the present disclosure. Referring to FIG. 6, the memory system 200 may be configured to include a host, a host controller 210, a cache system 220 and a memory. The host controller 210 may receive host data from the host and may transmit the host data to the cache system 220. The host controller 210 may include a host queue 212, and the cache system 220 may include a cache memory 222 and a cache controller 224. The host data outputted from the host may be stored into the host queue 212. In an embodiment, the host data may include a write command for performing a write operation of the memory, write data, and a set address in the cache memory 222 where the write data are written. In such a case, the set address may include information on an address of the memory where the write data are written. In addition, the host data may include a read command for performing a read operation of the memory and a set address in the cache memory 222 where read data are stored. In such a case, the set address may include information on an address of the memory where the read data are stored. The host queue 212 may have a plurality of storage elements. Each of the plurality of storage elements of the host queue 212 may store a unit of host data. The host controller 210 may store the host data sequentially outputted from the host into respective ones of the plurality of storage elements of the host queue 212 in the same sequence as outputted from the host. In a host data transmission mode, if all of the storage elements in the host queue 212 are filled with the host data, the host controller 210 may transmit the host data to the cache system 220 in the same sequence as stored into the host queue 212. The host queue 212 may have the same configuration as described with reference to FIG. 2.

As described above, the cache system 220 may be configured to include the cache memory 222 and the cache controller 224. The cache controller 224 may control an operation of the cache memory 222. Specifically, the cache controller 224 may control an operation for storing the write data into the cache memory 222 and an operation for transmitting the stored write data to the memory in response to a write request outputted from the host. In addition, the cache controller 224 may control an operation for storing the read data outputted from the memory into the cache memory 222 and an operation for transmitting the stored read data to the host in response to a read request outputted from the host. The cache controller 224 may communicate with the host controller 210 to control the operations of the cache memory 222. The cache memory 222 may have the same configuration as described with reference to FIG. 3.

In the memory system 200, the cache controller 224 may transmit a plurality of full flag signals, for example, first to $N^{th}$ full flag signals FULL_FLAG(0), FULL_FLAG(1), . . . and FULL_FLAG(N−1) to the host controller 210. In an embodiment, the first to $N^{th}$ full flag signals FULL_FLAG(0), FULL_FLAG(1), . . . and FULL_FLAG(N−1) may be transmitted through first to $N^{th}$ transmission lines disposed between the host controller 210 and the cache system 220. In an embodiment, the first to $N^{th}$ full flag signals FULL_FLAG(0), FULL_FLAG(1), . . . and FULL_FLAG(N−1) may be transmitted by a request outputted from the host controller 210. In an embodiment, the first to $N^{th}$ full flag signals FULL_FLAG(0), FULL_FLAG(1), . . . and FULL_FLAG(N−1) may be periodically transmitted. Each of the first to $N^{th}$ full flag signals FULL_FLAG(0), FULL_FLAG(1), . . . and FULL_FLAG(N−1) may be comprised of a bit, a logic level of which indicates a status of any one of the plurality of sets constituting the cache memory 222 of the cache system 220, for example, a logic level of which indicates whether the corresponding set has a set full status or a set available status. For instance, if a certain one of the first to $N^{th}$ full flag signals FULL_FLAG(0), FULL_FLAG(1), . . . and FULL_FLAG(N−1) has a logic level of "1", a certain set corresponding to the certain full flag signal among the plurality of sets constituting the cache memory 222 may have a set full status which means that the caching operation for the certain set is unavailable. In contrast, if a certain one of the first to $N^{th}$ full flag signals FULL_FLAG(0), FULL_FLAG(1), . . . and FULL_FLAG(N−1) has a logic level of "0", a certain set corresponding to the certain full flag signal among the plurality of sets constituting the cache memory 222 may have a set available status which means that the caching operation for the certain set is available.

The number "N" of the first to $N^{th}$ full flag signals FULL_FLAG(0), FULL_FLAG(1), . . . and FULL_FLAG(N−1) may be equal to the number of the sets constituting the cache memory 222 of the cache system 220. The first to $N^{th}$ full flag signals FULL_FLAG(0), FULL_FLAG(1), . . . and FULL_FLAG(N−1) may correspond to the sets constituting the cache memory 222, respectively. For example, the first full flag signal FULL_FLAG(0) may denote the availability or unavailability of the caching operation for the first set SET=0 of the cache memory 222, and the second full flag signal FULL_FLAG(1) may denote the availability or unavailability of the caching operation for the second set SET=1 of the cache memory 222. Similarly, the $N^{th}$ full flag signal FULL_FLAG(N−1) may denote the availability or unavailability of the caching operation for the $N^{th}$ set SET=(N−1) of the cache memory 222.

The host controller 210 may transmit the host data to the cache controller 224 or not according to logic levels of the first to $N^{th}$ full flag signals FULL_FLAG(0), FULL_FLAG(1), . . . and FULL_FLAG(N−1). For example, in the event that the host data to be transmitted to the first set SET=0 of the cache memory 222 are on standby, the host controller 210 may not transmit the host data on standby to the cache system 220 if the first full flag signal FULL_FLAG(0) corresponding to the first set SET=0 of the cache memory 222 has a logic level of "1". In contrast, if the first full flag signal FULL_FLAG(0) corresponding to the first set SET=0 of the cache memory 222 has a logic level of "0", the host controller 210 may transmit the host data on standby to the cache system 220 and may determine transmission or non-transmission of the next host data.

Figure 7:
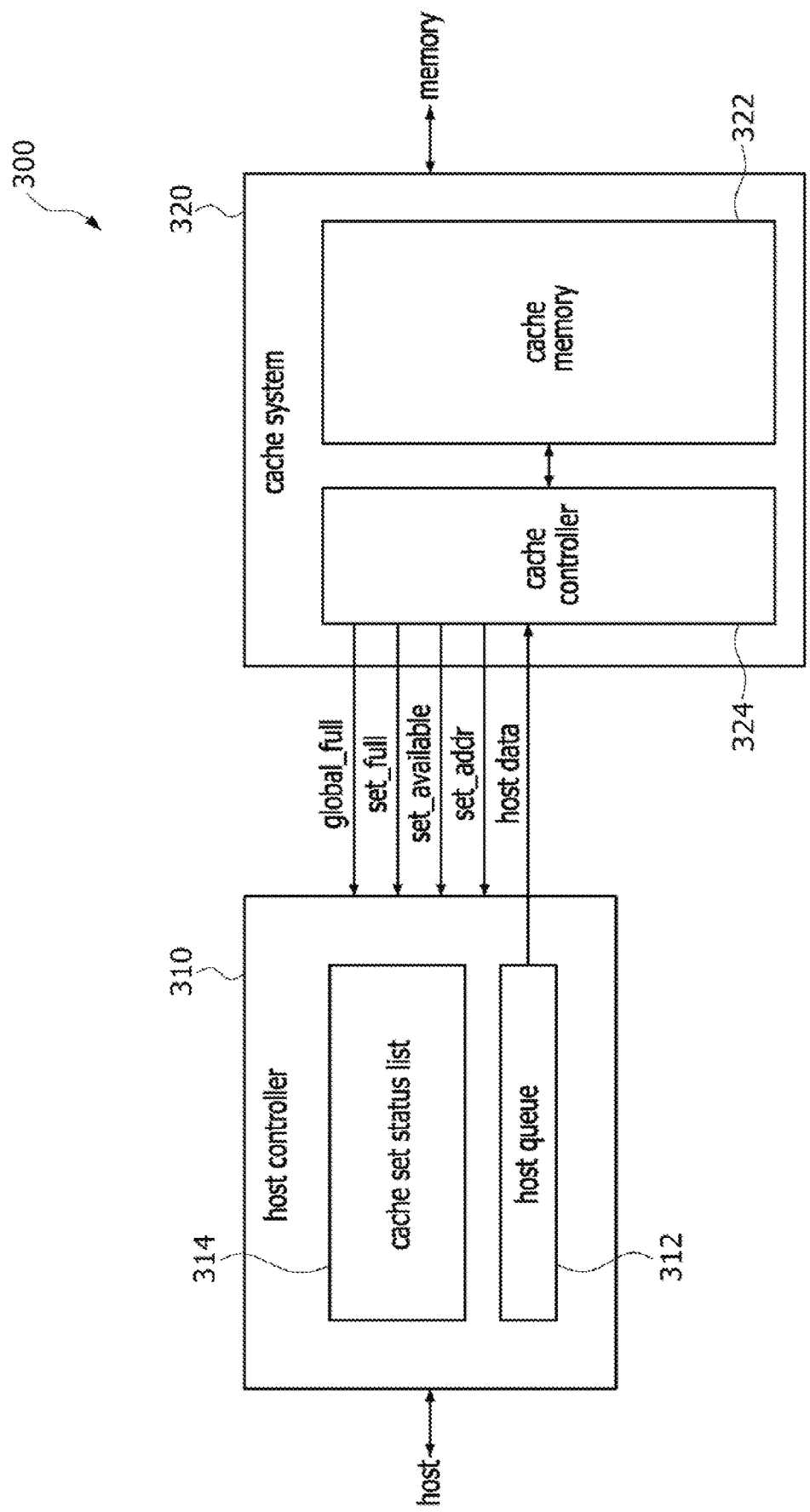
FIG. 7 is a block diagram illustrating a memory system according to yet another embodiment of the present disclosure.
Figure 8:
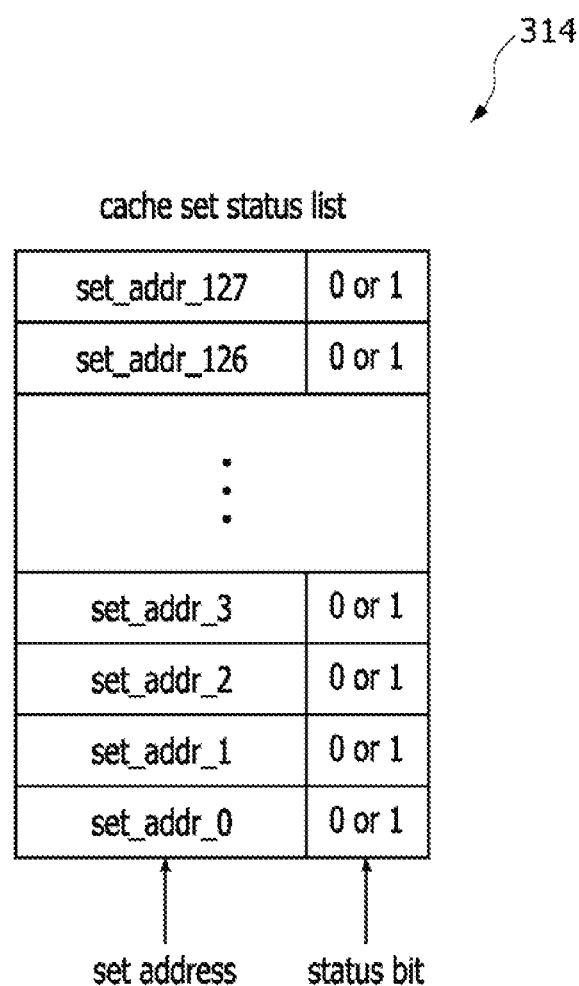
FIG. 8 is a schematic view illustrating an example of a cache set status list included in the memory system of FIG. 7.

FIG. 7 is a block diagram illustrating a memory system 300 according to yet another embodiment of the present disclosure, and FIG. 8 is a schematic view illustrating an example of a cache set status list included in the memory system 300 of FIG. 7. Firstly, referring to FIG. 7, the memory system 300 may be configured to include a host, a host controller 310, a cache system 320 and a memory. The host controller 310 may receive host data from the host and may transmit the host data to the cache system 320. The host controller 310 may include a host queue 312 and a cache set status list 314, and the cache system 320 may include a cache memory 322 and a cache controller 324. The host data outputted from the host may be stored into the host queue 312. In an embodiment, the host data may include a write command for performing a write operation of the memory, write data, and a set address in the cache memory 322 where the write data are written. In such a case, the set address may include information on an address of the memory where the write data are written. In addition, the host data may include a read command for performing a read operation of the memory and a set address in the cache memory 322 where read data are stored. In such a case, the set address may include information on an address of the memory where the read data are stored. The host queue 312 may have a plurality of storage elements. Each of the plurality of storage elements of the host queue 312 may store a unit of host data. The host controller 310 may store the host data sequentially outputted from the host into respective ones of the plurality of storage elements of the host queue 312 in the same sequence as outputted from the host. In a host data transmission mode, if all of the storage elements in the host queue 312 are filled with the host data, the host controller 310 may transmit the host data to the cache system 320 in the same sequence as stored into the host queue 312. The host queue 312 may have the same configuration as described with reference to FIG. 2.

The cache set status list 314 may have a plurality of storage elements that store data including information on statuses of sets constituting the cache memory 322. As illustrated in FIG. 8, the cache set status list 314 may have first storage regions in which a plurality of set addresses are stored and second storage regions in which status bits are stored. The set addresses (e.g., first to $128^{th}$ set addresses SET_ADDR_0, . . . and SET_ADDR_127) corresponding to addresses of the sets constituting the cache memory 322 may be stored in the first storage regions, respectively. Information on the status bits indicating statuses of the sets of the cache memory 322, which are designated by the set addresses, may be stored in the second regions, respectively. The information on the status bits of the sets may have a binary number such as a logic level of "0" or a logic level of "1". For example, if a caching operation for a certain set of the cache memory 322 designated by the set address is unavailable, the status bit of the certain set may have a logic level of "0". In contrast, if a caching operation for a certain set of the cache memory 322 designated by the set address is available, the status bit of the certain set may have a logic level of "1".

The host controller 310 may transmit the host data to the cache controller 324 or not according to logic levels of the status bits of the sets constituting the cache memory 322, which are stored in the cache set status list 314. In an embodiment, if the status bit of a certain set to which the host data currently on standby are transmitted has a logic level of "1", the host controller 310 may interrupt the transmission of the host data currently on standby and may determine the transmission or non-transmission of the next host data. In contrast, if the status bit of a certain set to which the host data currently on standby are transmitted has a logic level of "0", the host controller 310 may transmit the host data currently on standby to the cache memory 322. The host controller 310 may change values (i.e., logic levels) of the status bits, which are stored in the cache set status list 314. The values of the status bits may be changed by a set full signal SET_FULL and a set available signal SET_AVAILABLE transmitted from the cache controller 324 to the host controller 310. The host controller 310 may also receive a set address SET_ADDR in addition to the set full signal SET_FULL and the set available signal SET_AVAILABLE from the cache controller 324. The set address SET_ADDR may be transmitted together with the set full signal SET_FULL or the set available signal SET_AVAILABLE. An operation for changing the cache set status list 314 according to transmission of the set full signal SET_FULL or the set available signal SET_AVAILABLE will be described in detail hereinafter.

The host controller 310 may receive a global full signal GLOBAL_FULL from the cache controller 324. In an embodiment, the global full signal GLOBAL_FULL may notify whether at least one of the sets constituting the cache memory 322 has a set full status. For example, if the global full signal GLOBAL_FULL has a logic level of "1", at least one of the sets constituting the cache memory 322 may have a set full status. In contrast, if the global full signal GLOBAL_FULL has a logic level of "0", none of the sets constituting the cache memory 322 may have a set full status. That is, if the global full signal GLOBAL_FULL has a logic level of "0", the caching operations for all of the sets constituting the cache memory may be available. The host controller 310 may receive the global full signal GLOBAL_FULL from the cache controller 324 to discriminate whether the cache set status list 314 is checked while the host data are transmitted. For example, if the global full signal GLOBAL_FULL having a logic level of "1" is transmitted to the host controller 310, the host controller 310 may check logic levels of the status bits stored in the cache set status list 314 while the host data are transmitted and may then determine transmission or non-transmission of the host data. In contrast, if the global full signal GLOBAL_FULL having a logic level of "0" is transmitted to the host controller 310, the host controller 310 may immediately transmit the host data to the cache controller 324 without checking the logic levels of the status bits stored in the cache set status list 314 while the host data are transmitted.

As mentioned above, the cache system 320 may be configured to include the cache memory 322 and the cache controller 324. The cache memory 322 may have the same configuration as described with reference to FIG. 3. The cache controller 324 may check the statuses of the sets constituting the cache memory 322 to transmit the global full signal GLOBAL_FULL to the host controller 310. In an embodiment, the cache controller 324 may grant a value (i.e., a logic level) of "0" or "1" to the status bits according to the statuses of the sets after checking the statuses of all of the sets included in the cache memory 322. A value of "1" may be assigned to the sets having a set full status, and a value of "0" may be assigned to the sets having a non-set full status (e.g., a set available status). Subsequently, after a logical "OR" operation for the granted values of the status bits is performed, the result of the logical "OR" operation may be transmitted to the host controller 310 as the global full signal GLOBAL_FULL. Thus, if at least one of the sets constituting the cache memory 322 has the set full status, at least one of the granted values of the status bits may also have a value of "1" and the global full signal GLOBAL_FULL may be transmitted with a value of "1". In an embodiment, the global full signal GLOBAL_FULL may be periodically transmitted from the cache controller 324 to the host controller 310. Alternatively, the global full signal GLOBAL_FULL may be transmitted from the cache controller 324 to the host controller 310 according to a request of the host controller 310.

Figure 9:
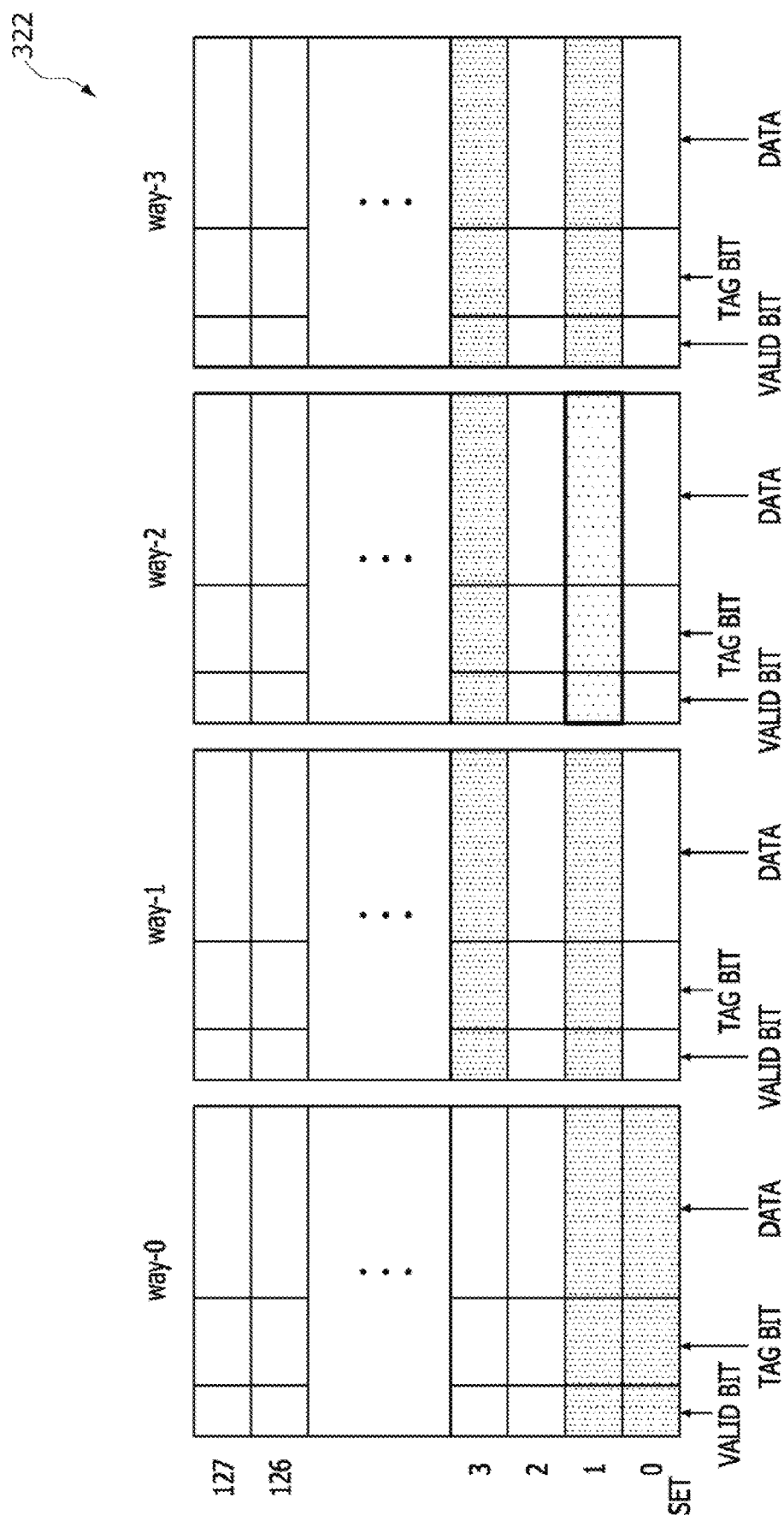
FIGS. 9 and 10 are schematic views illustrating status change of a cache memory in the event that a set full signal is generated during an operation of the memory system shown in FIG. 7.
Figure 10:
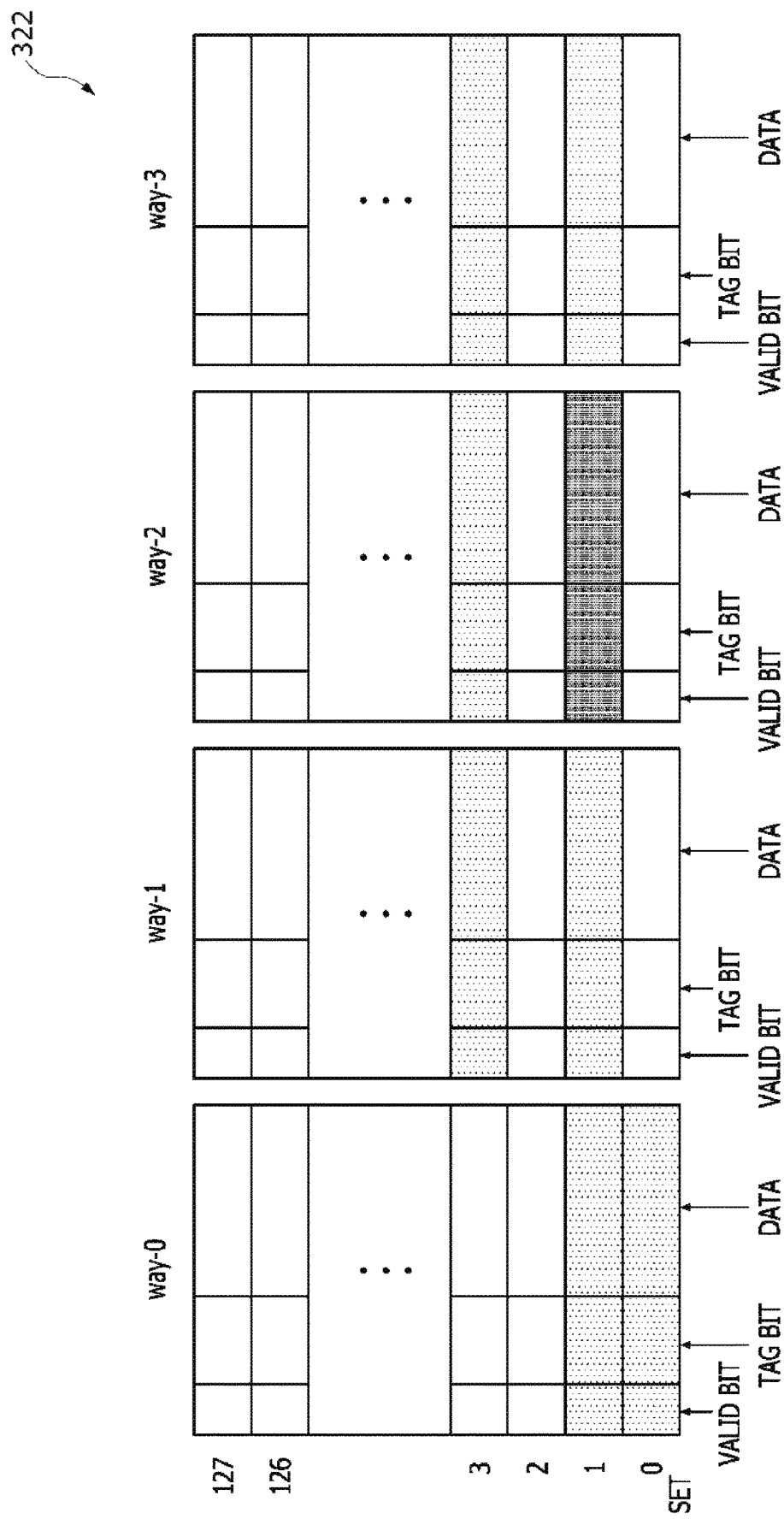
Figure 11:
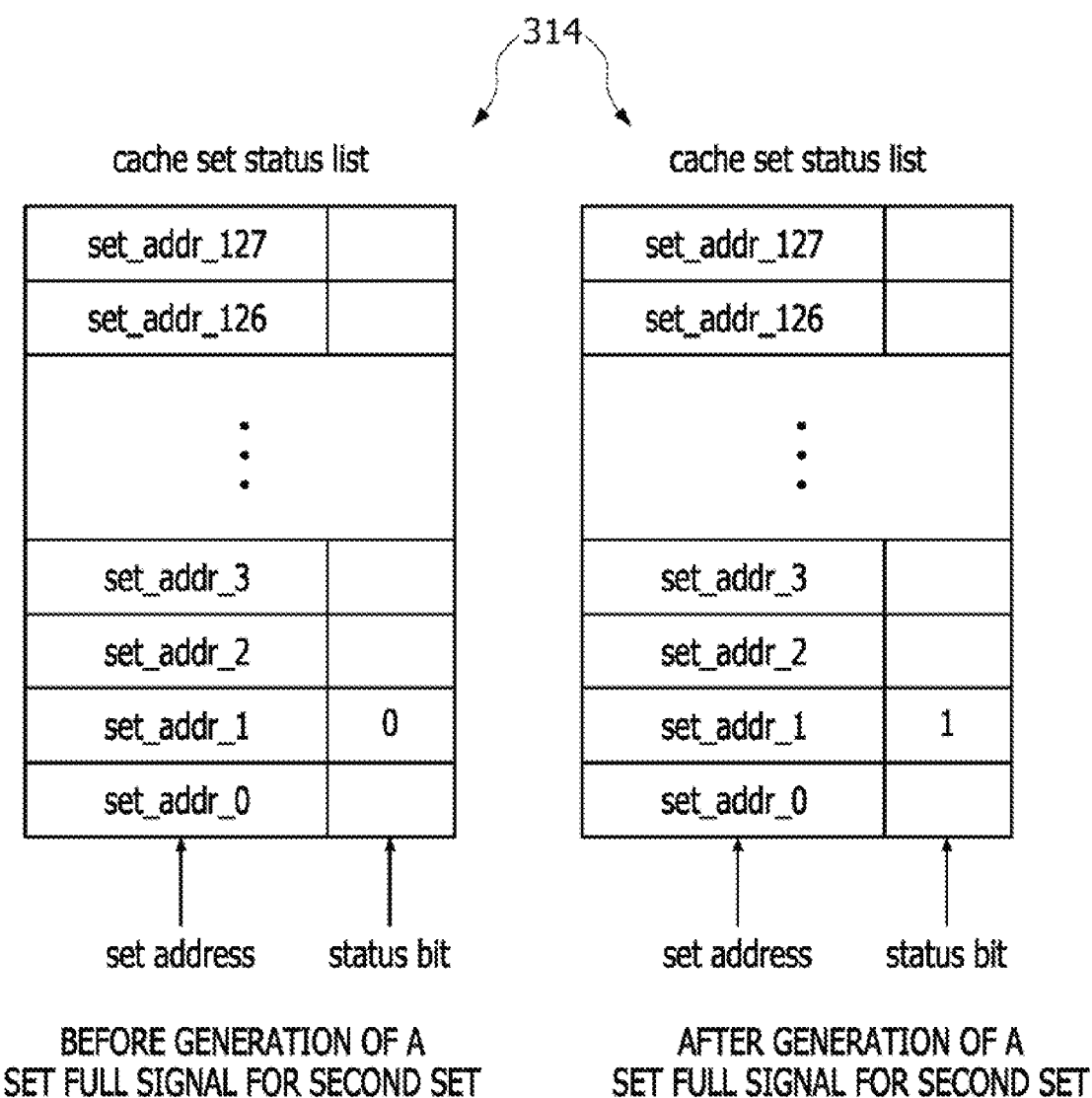
FIG. 11 is a schematic view illustrating status change of a cache set status list in the event that a set full signal is generated during an operation of the memory system shown in FIG. 7.

FIGS. 9 and 10 are schematic views illustrating status change of the cache memory 322 in the event that the set full signal SET_FULL is generated during an operation of the memory system 300 shown in FIG. 7, and FIG. 11 is a schematic view illustrating status change of the cache set status list 314 in the event that the set full signal SET_FULL is generated during an operation of the memory system 300 shown in FIG. 7. As illustrated in FIG. 9, in case of a first set SET=0 of the cache memory 322 configured to have a set associative cache architecture with four ways (i.e., first to fourth ways WAY-0, WAY-1, WAY-2 and WAY-3) and one hundred and twenty-eight sets (i.e., first to $128^{th}$ sets SET=0, . . . and SET=127), only a first block belonging to the first way WAY-0 may be filled with the data and first blocks belonging to the second to fourth ways WAY-1, WAY-2 and WAY-3 may be empty without the data. In case of a second set SET=1 of the cache memory 322, only a second block of the third way WAY-2 is empty without the data and all of second blocks of the remaining ways (i.e., the first, second and fourth ways WAY-0, WAY-1 and WAY-3) may be filled with the data. In case of a third set SET=2 of the cache memory 322, all of third blocks of the first to fourth ways WAY-0, WAY-1, WAY-2 and WAY-3 may be empty without the data. In case of a fourth set SET=3 of the cache memory 322, only a fourth block of the first way WAY-0 may be empty without the data and all of fourth blocks of the second to fourth ways WAY-1, WAY-2 and WAY-3 may be filled with the data. In case of the remaining sets (i.e., the fifth to $128^{th}$ sets SET=4, . . . and SET=127) of the cache memory 322, it may be assumed that all of blocks of the first to fourth ways WAY-0, WAY-1, WAY-2 and WAY-3 are empty without the data.

In case of the second set SET=1, all of the blocks are not filled with the data to provide the second set SET=1 having a set available status. Thus, as illustrated in a left portion of FIG. 11, a value of "0" may be allocated as a logic level of the status bit of the second set SET=1 designated by the second set address SET_ADDR_1. At this status, as illustrated in FIG. 10, a status of the second set SET=1 may be changed into the set full status if the host data are transmitted to the second set SET=1 and a caching operation is performed to store the host data into the second block (corresponding to an empty block) of the third way WAY-2. In such a case, the cache controller 324 may transmit the set full signal SET_FULL and the second set address SET_ADDR_1 to the host controller 310. As a result, as illustrated in a right portion of FIG. 11, the previous value of "0" allocated as the logic level of the status bit of the second set SET=1 designated by the second set address SET_ADDR_1 may be changed into a value of "1".

Figure 12:
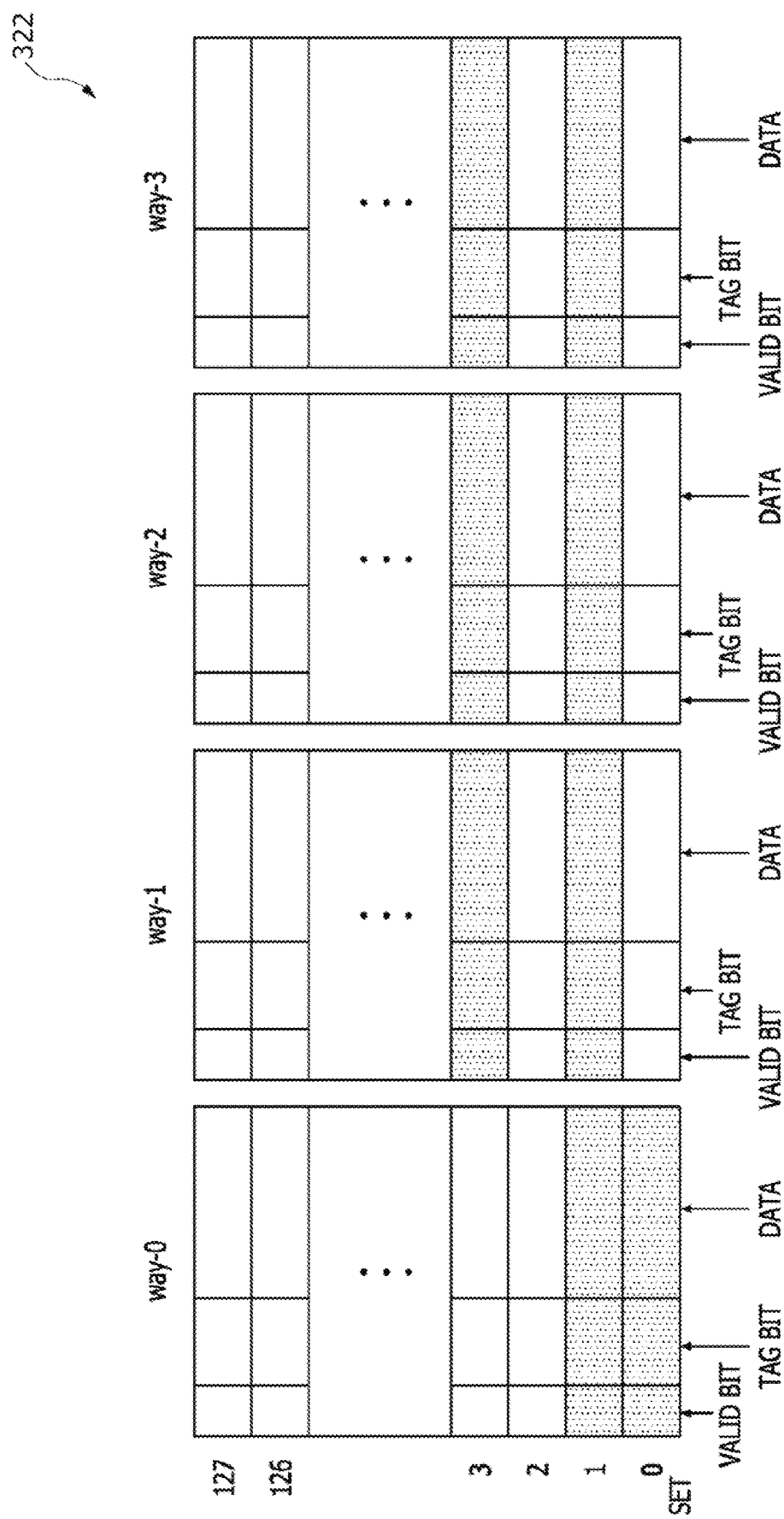
FIGS. 12 and 13 are schematic views illustrating status change of a cache memory in the event that a set available signal is generated during an operation of the memory system shown in FIG. 7.
Figure 13:
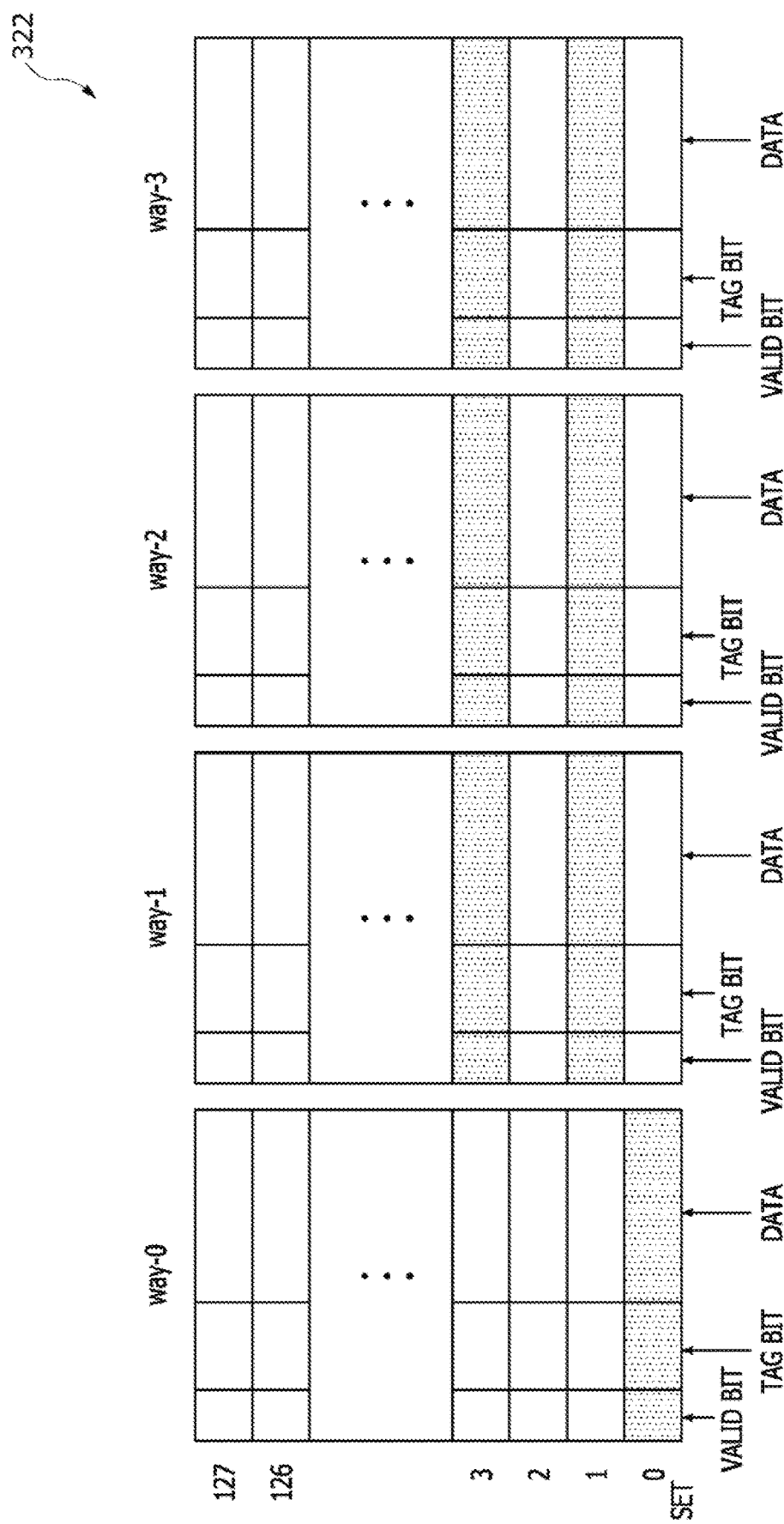
Figure 14:
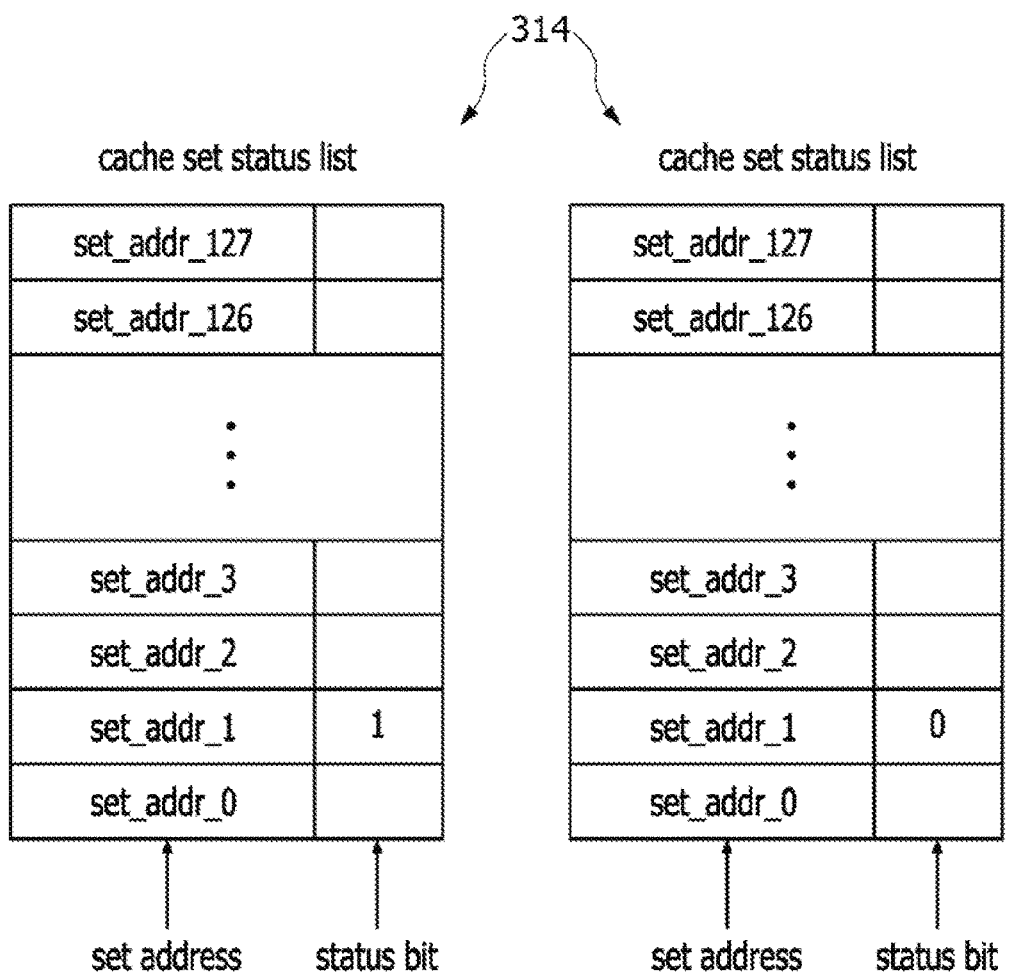
FIG. 14 is a schematic view illustrating status change of a cache set status list in the event that a set available signal is generated during an operation of the memory system shown in FIG. 7.

FIGS. 12 and 13 are schematic views illustrating status change of the cache memory 322 in the event that the set available signal SET_AVAILABLE is generated during an operation of the memory system 300 shown in FIG. 7, and FIG. 14 is a schematic view illustrating status change of the cache set status list 314 in the event that the set available signal SET_AVAILABLE is generated during an operation of the memory system 300 shown in FIG. 7. As illustrated in FIG. 12, in the case of the first set SET=0 of the cache memory 322 configured to have the set associative cache architecture with four ways (i.e., the first to fourth ways WAY-0, WAY-1, WAY-2 and WAY-3) and one hundred and twenty-eight sets (i.e., the first to $128^{th}$ sets SET=0, . . . and SET=127), only the first block belonging to the first way WAY-0 may be filled with the data and first blocks belonging to the second to fourth ways WAY-1, WAY-2 and WAY-3 may be empty without the data. In case of the second set SET=1 of the cache memory 322, all of the second blocks of the first to fourth ways WAY-0, WAY-1, WAY-2 and WAY-3 may be filled with the data. In case of the third set SET=2 of the cache memory 322, all of the third blocks of the first to fourth ways WAY-0, WAY-1, WAY-2 and WAY-3 may be empty without the data. In case of the fourth set SET=3 of the cache memory 322, only the fourth block of the first way WAY-0 may be empty without the data and all of the fourth blocks of the second to fourth ways WAY-1, WAY-2 and WAY-3 may be filled with the data. In case of the remaining sets (i.e., the fifth to $128^{th}$ sets SET=4, . . . and SET=127) of the cache memory 322, it may be assumed that all of blocks of the first to fourth ways WAY-0, WAY-1, WAY-2 and WAY-3 are empty without the data.

In case of the second set SET=1, all of the blocks are filled with the data to provide the second set SET=1 having a set full status. Thus, as illustrated in a left portion of FIG. 14, a value of "1" may be allocated as a logic level of the status bit of the second set SET=1 designated by the second set address SET_ADDR_1. At this status, as illustrated in FIG. 13, a status of the second set SET=1 may be changed into the set available status notifying that at least one of the blocks in the second set SET=1 is usable if the second block of the first way WAY-0 is usable. For example, if the data stored in the second block of the first way WAY-0 are transmitted and written into the memory, the second block of the first way WAY-0 may be regarded as having a usable status. In such a case, the cache controller 324 may transmit the set available signal SET_AVAILABLE and the second set address SET_ADDR_1 to the host controller 310. As a result, as illustrated in a right portion of FIG. 14, the previous value of "1" allocated as the logic level of the status bit of the second set SET=1 designated by the second set address SET_ADDR_1 may be changed into a value of "0".

Figure 15:
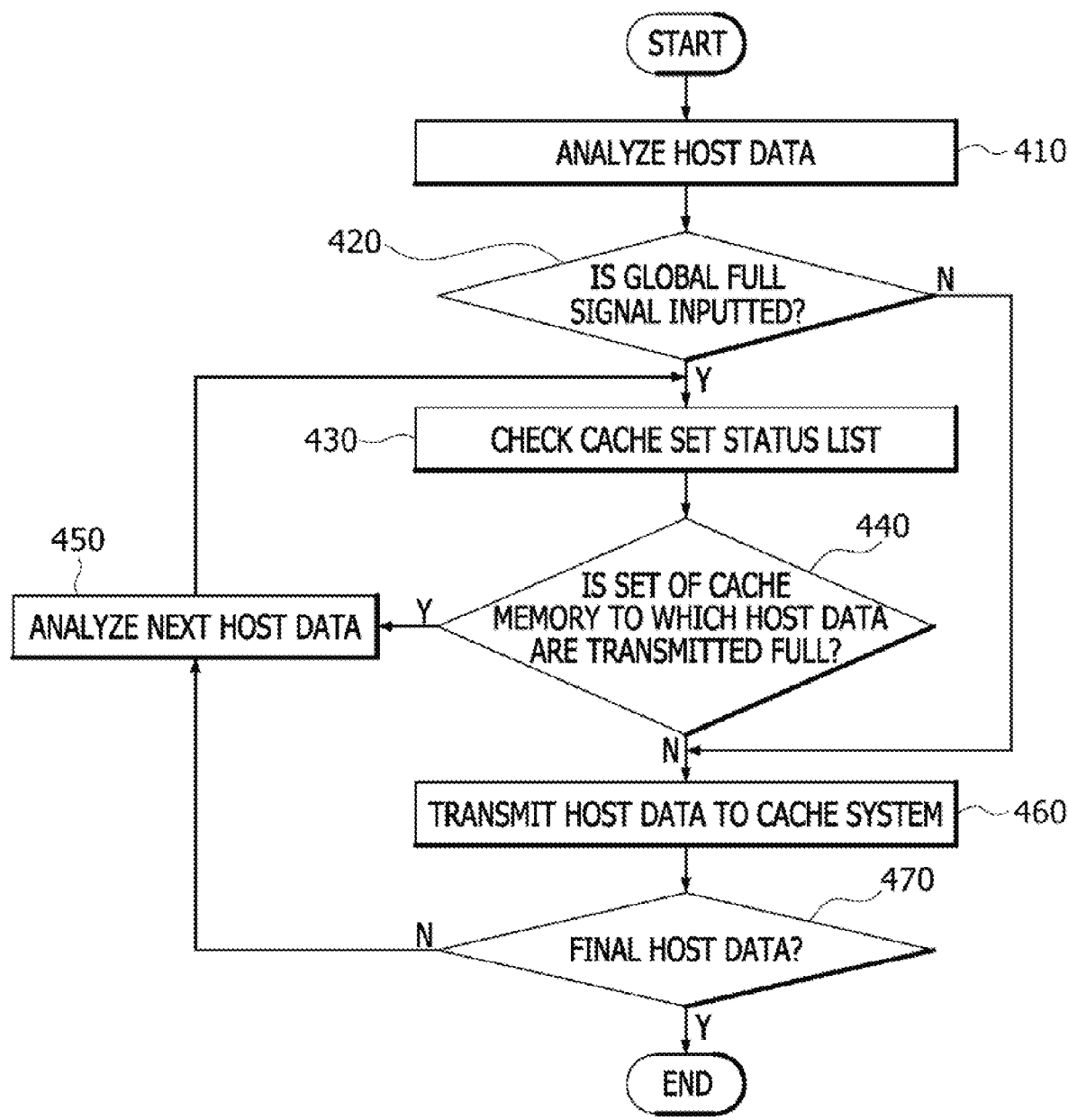
FIG. 15 is a flowchart illustrating a procedure in which host data are processed during an operation of the memory system shown in FIG. 7.

FIG. 15 is a flowchart illustrating a procedure for which the host data are processed during an operation of the memory system 300 shown in FIG. 7. Referring to FIGS. 7 and 15, at a step 410, the host controller 310 may analyze the host data stored in the host queue 312. As described with reference to FIG. 3, the host data may be comprised of a command, a set address and/or data and may be stored into the queue storage elements QUEUE_STORAGE-0, . . . and QUEUE_STORAGE-3 constituting the host queue 312. In the host data transmission mode, the host data stored in the host queue 312 may be transmitted to the cache controller 324 such that the host data stored in the first queue storage element QUEUE_STORAGE-0, the host data stored in the second queue storage element QUEUE_STORAGE-1, the host data stored in the third queue storage element QUEUE_STORAGE-2, and the host data stored in the fourth queue storage element QUEUE_STORAGE-3 are transmitted in sequence. In an embodiment, the host data transmission mode may be set by a request of the host or the host controller 310 may independently set the host data transmission mode according to an idle status of the memory system 300. At the step 410, that the host controller 310 analyzes the host data may include recognizing the set addresses of the host data sequentially transmitted from the host queue 312 to the cache controller 324.

At a step 420, whether the global full signal GLOBAL_FULL outputted from the cache controller 324 is inputted to the host controller 310 may be discriminated. In an embodiment, if the global full signal GLOBAL_FULL is transmitted to the host controller 310 by a request of the host, the host controller 310 may request the cache controller 324 to transmit the global full signal GLOBAL_FULL before the step 420. In an embodiment, if the global full signal GLOBAL_FULL is periodically transmitted to the host controller 310, the host controller 310 may discriminate whether the global full signal GLOBAL_FULL is inputted to the host controller 310 in advance. If the global full signal GLOBAL_FULL is inputted to the host controller 310 at the step 420 (i.e., at least one of the sets included in the cache memory 322 has a set full status at the step 420), the host controller 310 may check the cache set status list 314 at a step 430. In contrast, if the global full signal GLOBAL_FULL is not inputted to the host controller 310 at the step 420 (i.e., none of the sets included in the cache memory 322 has a set full status at the step 420), the host controller 310 may transmit the host data to the cache system 320 at a step 460.

After the cache set status list 314 is checked at the step 430, the host controller 310 may discriminate whether a certain set of the cache memory 322 to which first host data are transmitted has a set full status (see a step 440). Specifically, as described with reference to FIG. 8, the host controller 310 may read a value of the status bit of the address (i.e., the first set address SET_ADDR_0) of the first set to which the first host data are transmitted among the sets addresses stored in the cache set status list 314. If the status bit of the set address has a value of "0" at the step 440 (i.e., the first set does not have a set full status), the host controller 310 may transmit the host data to the cache system 320 at the step 460. If the status bit of the set address has a value of "1" at the step 440 (i.e., the first set has a set full status), the host controller 310 may analyze next host data, for example, the second host data at a step 450. A process for analyzing the second host data at the step 450 may be performed using the same way as a process for analyzing the first host data at the step 410. After the second host data are analyzed at the step 450, the host controller 310 may check the cache set status list 314 at the step 430.

After the host data are transmitted to the cache controller 324 in the cache system 320 at the step 460, the cache controller 324 may discriminate whether the transmitted host data are final host data among the host data stored in the host queue 312 at a step 470. If the transmitted host data are discriminated as the final host data at the step 470, the host data transmission mode may terminate. If the transmitted host data are not the final host data at the step 470, the process of the step 450 may be performed again.

Figure 16:
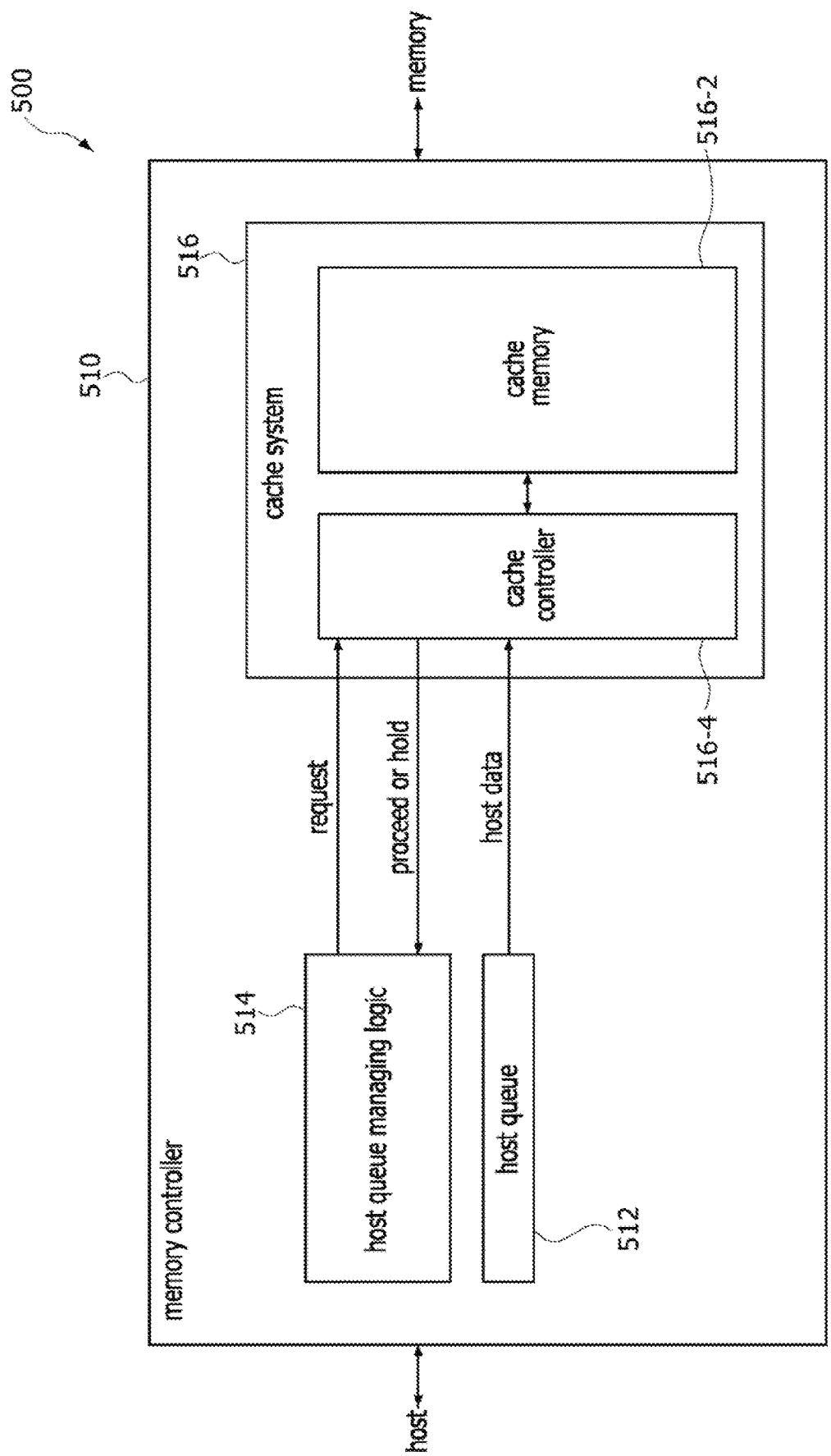
FIG. 16 is a block diagram illustrating a memory system according to still another embodiment of the present disclosure.

FIG. 16 is a block diagram illustrating a memory system 500 according to still another embodiment of the present disclosure. Referring to FIG. 16, the memory system 500 may be configured to include a host, a memory controller 510 and a memory. The memory controller 510 may control overall operations of the memory system 500 including an operation for accessing to the memory based on a request of the host or an algorithm stored in memory controller 510. The memory controller 510 may include a host queue 512, a host queue managing logic unit 514 and a cache system 516. The host queue 512 may be realized to have the same configuration as the host queue 112 described with reference to FIG. 2. The cache system 516 may include a cache memory 516-2 and a cache controller 516-4. The cache memory 516-2 may be realized to have the same configuration as the cache memory 122 described with reference to FIG. 3. The host queue managing logic unit 514 may manage an operation for transmitting the host data stored in the host queue 512 and may output a request signal to the cache controller 516-4 to manage the operation for transmitting the host data stored in the host queue 512. The request signal may include information on an address of the host data currently on standby.

The cache controller 516-4 may receive the request signal from the host queue managing logic unit 514 to transmit any one of a proceed signal and a hold signal to the host queue managing logic unit 514 according to a status of a set (hereinafter, referred to as a target set) to which the host data are transmitted among the sets constituting the cache memory 516-2. The proceed signal may be generated if a caching operation for the target set of the cache memory 516-2 is available, and the hold signal may be generated if the caching operation for the target set of the cache memory 516-2 is unavailable. The host queue managing logic unit 514 may receive the proceed signal or the hold signal from the cache controller 516-4 to control the host queue 512 such that the host data are transmitted to the cache controller 516-4 or the host data are not transmitted to the cache controller 516-4. Specifically, if the proceed signal is transmitted from the cache controller 516-4 to the host queue managing logic unit 514, the host queue managing logic unit 514 may control the host queue 512 such that the host data currently on standby in the host queue 512 are transmitted to the cache controller 516-4. If the hold signal is transmitted from the cache controller 516-4 to the host queue managing logic unit 514, the host queue managing logic unit 514 may control the host queue 512 such that the host queue 512 holds the host data currently on standby.

Figure 17:
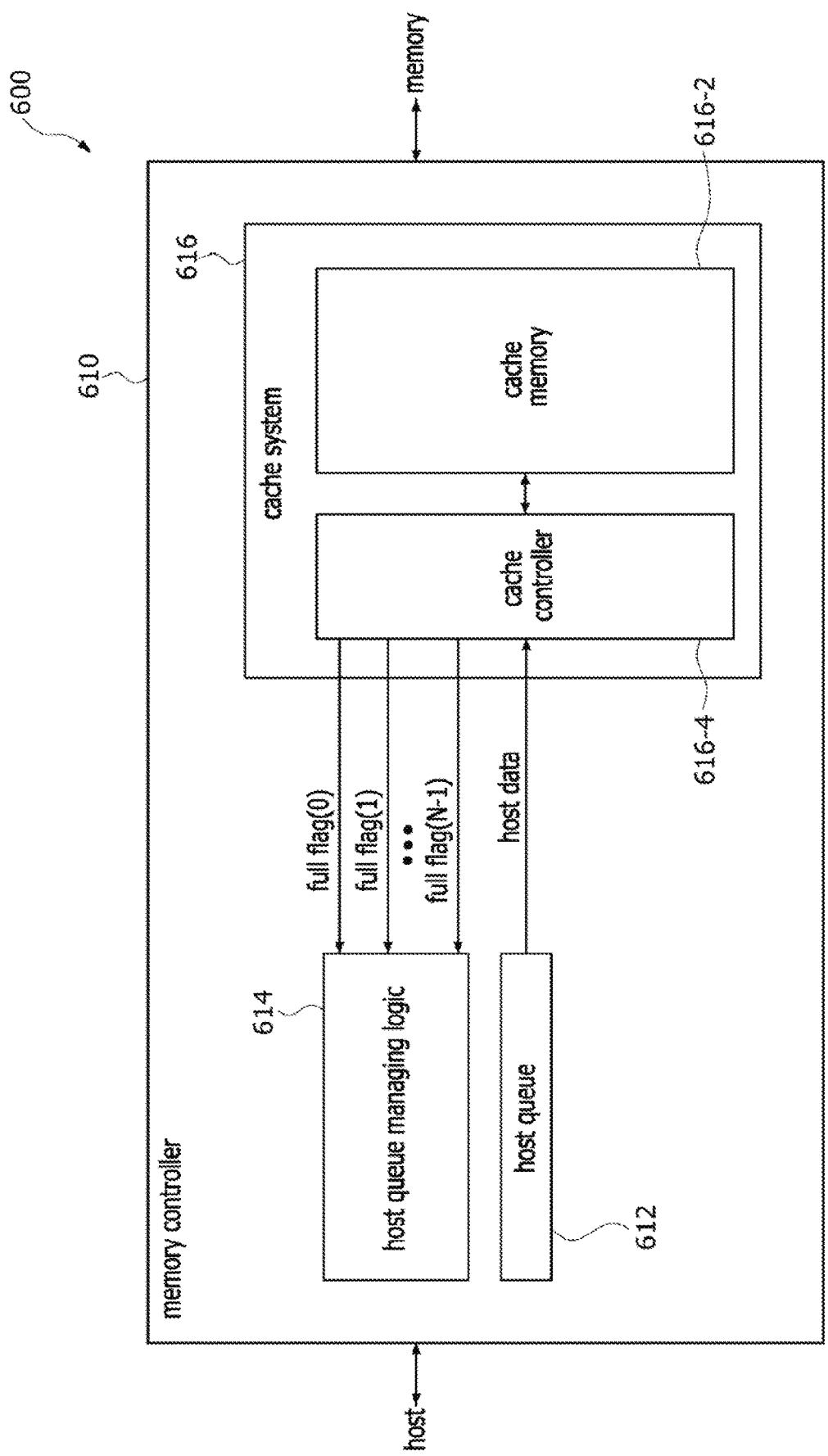
FIG. 17 is a block diagram illustrating a memory system according to yet still another embodiment of the present disclosure.

FIG. 17 is a block diagram illustrating a memory system 600 according to yet still another embodiment of the present disclosure. Referring to FIG. 17, the memory system 600 may be configured to include a host, a memory controller 610 and a memory. The memory controller 610 may control overall operations of the memory system 600 including an operation for accessing to the memory based on a request of the host or an algorithm stored in memory controller 610. The memory controller 610 may include a host queue 612, a host queue managing logic unit 614 and a cache system 616. The host queue 612 may be realized to have the same configuration as the host queue 112 described with reference to FIG. 2. The cache system 616 may include a cache memory 616-2 and a cache controller 616-4. The cache memory 616-2 may be realized to have the same configuration as the cache memory 122 described with reference to FIG. 3.

The host queue managing logic unit 614 may manage an operation for transmitting the host data stored in the host queue 612 and may receive a plurality of full flag signals, for example, first to $N^{th}$ full flag signals FULL_FLAG(0), FULL_FLAG(1), . . . and FULL_FLAG(N−1) from the cache controller 616-4 to manage the operation for transmitting the host data stored in the host queue 612. In an embodiment, the first to $N^{th}$ full flag signals FULL_FLAG(0), FULL_FLAG(1), . . . and FULL_FLAG(N−1) may be transmitted through first to $N^{th}$ transmission lines disposed between the cache controller 616-4 and the host queue managing logic unit 614. In an embodiment, the first to $N^{th}$ full flag signals FULL_FLAG(0), FULL_FLAG(1), . . . and FULL_FLAG(N−1) may be transmitted by a request of the host queue managing logic unit 614. In an embodiment, the first to $N^{th}$ full flag signals FULL_FLAG(0), FULL_FLAG(1), . . . and FULL_FLAG(N−1) may be periodically transmitted. Each of the first to $N^{th}$ full flag signals FULL_FLAG(0), FULL_FLAG(1), . . . and FULL_FLAG(N−1) may be comprised of a bit, a logic level of which indicates a status of any one of the plurality of sets constituting the cache memory 616-2 of the cache system 616, for example, a logic level of which indicates whether the corresponding set has a set full status or a set available status. For instance, if a certain one of the first to $N^{th}$ full flag signals FULL_FLAG (0), FULL_FLAG(1), . . . and FULL_FLAG(N-1) has a logic level of "1", a certain set corresponding to the certain full flag signal among the plurality of sets constituting the cache memory 616-2 may have a set full status which means that the caching operation for the certain set is unavailable. In contrast, if a certain one of the first to $N^{th}$ full flag signals FULL_FLAG(0), FULL_FLAG(1), . . . and FULL_FLAG (N-1) has a logic level of "0", a certain set corresponding to the certain full flag signal among the plurality of sets constituting the cache memory 616-2 may have a set available status which means that the caching operation for the certain set is available.

The number "N" of the first to $N^{th}$ full flag signals FULL_FLAG(0), FULL_FLAG(1), . . . and FULL_FLAG (N-1) may be equal to the number of the sets constituting the cache memory 616-2 of the cache system 616. The first to $N^{th}$ full flag signals FULL_FLAG(0), FULL_FLAG(1), . . . and FULL_FLAG(N-1) may correspond to the sets constituting the cache memory 616-2, respectively. For example, the first full flag signal FULL_FLAG(0) may denote the availability or unavailability of the caching operation for the first set SET=0 of the cache memory 616-2, and the second full flag signal FULL_FLAG(1) may denote the availability or unavailability of the caching operation for the second set SET=1 of the cache memory 616-2. Similarly, the $N^{th}$ full flag signal FULL_FLAG(N-1) may denote the availability or unavailability of the caching operation for the $N^{th}$ set SET=(N-1) of the cache memory 616-2.

The host queue managing logic unit 614 may control the host queue 612 such that the host data are transmitted to the cache controller 616-4 or not transmitted to the cache controller 616-4 according to a value of each of the first to $N^{th}$ full flag signals FULL_FLAG(0), FULL_FLAG(1), . . . and FULL_FLAG(N-1) outputted from the cache controller 616-4 of the cache system 616. For example, in the event that the host data to be transmitted to the first set SET=0 of the cache memory 616-2 are on standby, the host queue managing logic unit 614 may not transmit the host data on standby to the cache system 616 if the first full flag signal FULL_FLAG(0) corresponding to the first set SET=0 of the cache memory 616-2 has a logic level of "1". In contrast, if the first full flag signal FULL_FLAG(0) corresponding to the first set SET=0 of the cache memory 616-2 has a logic level of "0", the host queue managing logic unit 614 may transmit the host data on standby to the cache system 616 and may determine transmission or non-transmission of the next host data.

Figure 18:
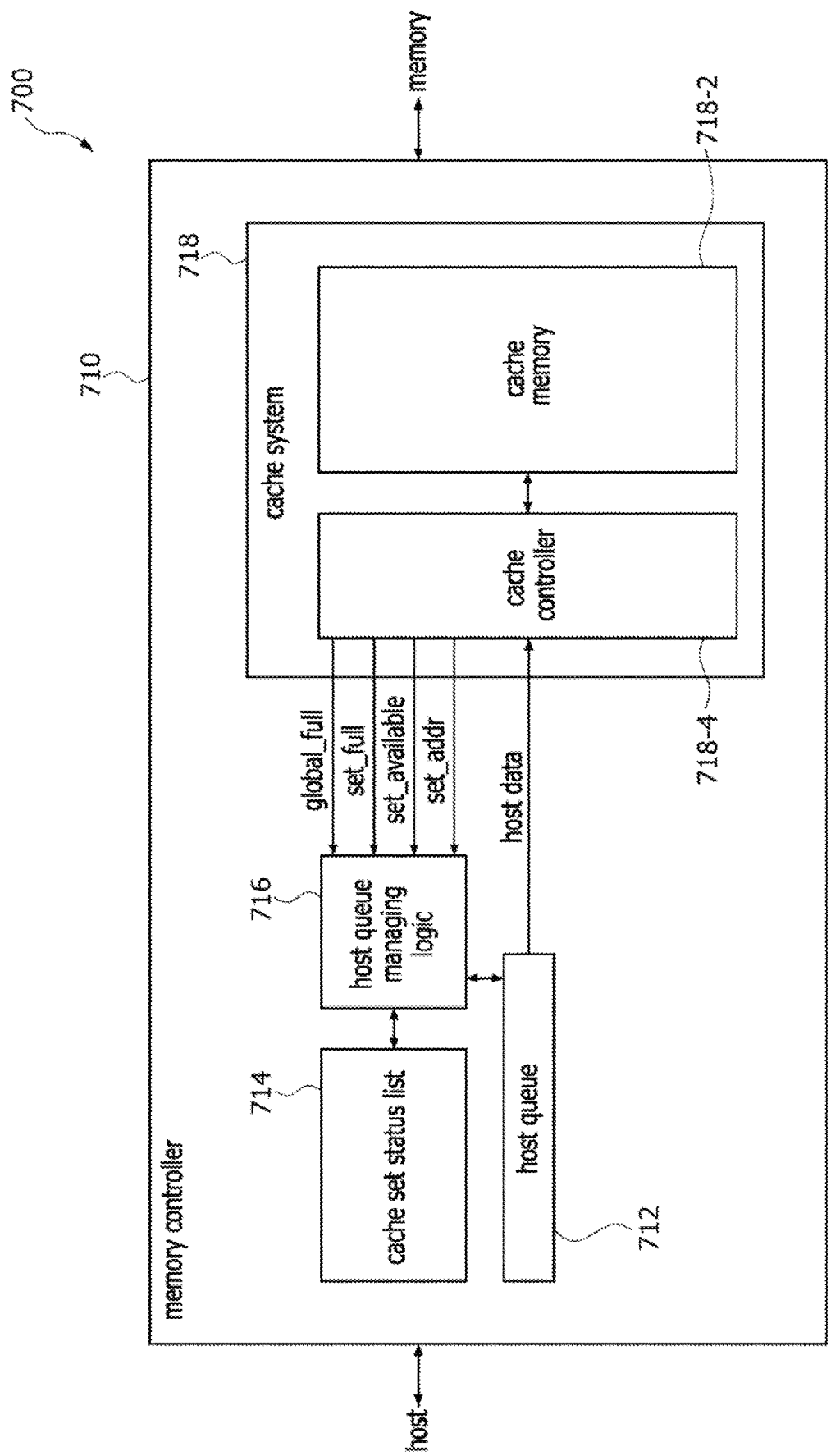
FIG. 18 is a block diagram illustrating a memory system according to further another embodiment of the present disclosure.

FIG. 18 is a block diagram illustrating a memory system 700 according to further another embodiment of the present disclosure. Referring to FIG. 18, the memory system 700 may be configured to include a host, a memory controller 710 and a memory. The memory controller 710 may control overall operations of the memory system 700 including an operation for accessing the memory based on a request of the host or an algorithm stored in memory controller 710. The memory controller 710 may include a host queue 712, cache set status list 714, a host queue managing logic unit 716 and a cache system 718. The host queue 712 may be realized to have the same configuration as the host queue 112 described with reference to FIG. 2. The cache system 718 may include a cache memory 718-2 and a cache controller 718-4. The cache memory 718-2 may be realized to have the same configuration as the cache memory 122 described with reference to FIG. 3.

The cache set status list 714 may have a plurality of storage elements that store data including information on statuses of sets constituting the cache memory 718-2. The cache set status list 714 may be realized to have the same configuration as the cache set status list 314 described with reference to FIG. 8. The host queue managing logic unit 716 may determine whether the host queue 712 will transmit the host data to the cache controller 718-4 according to values of the status bits of the sets constituting the cache memory 718-2, which are stored in the cache set status list 714. In an embodiment, if the status bit of a certain set to which the host data currently on standby are transmitted has a logic level of "1", the host queue managing logic unit 716 may control the host queue 712 such that the host queue 712 interrupts the transmission of the host data currently on standby and may determine the transmission or non-transmission of the next host data. In contrast, if the status bit of a certain set to which the host data currently on standby are transmitted has a logic level of "0", the host queue managing logic unit 716 may control the host queue 712 such that the host queue 712 transmits the host data currently on standby to the cache memory 718-2. The host queue managing logic unit 716 may change values (i.e., logic levels) of the status bits, which are stored in the cache set status list 714. The values of the status bits may be changed by a set full signal SET_FULL and a set available signal SET_AVAILABLE outputted from the cache controller 718-4. The host queue managing logic unit 716 may also receive a set address SET_ADDR in addition to the set full signal SET_FULL and the set available signal SET_AVAILABLE from the cache controller 718-4. The set address SET_ADDR may be transmitted together with the set full signal SET_FULL or the set available signal SET_AVAILABLE. An operation for changing the cache set status list 714 according to transmission of the set full signal SET_FULL or the set available signal SET_AVAILABLE may be the same as described with reference to FIGS. 9 to 14 except that the host queue managing logic unit 716 has the function of the host controller 310.

The host queue managing logic unit 716 may receive a global full signal GLOBAL_FULL from the cache controller 718-4. In an embodiment, the global full signal GLOBAL_FULL may notify whether at least one of the sets constituting the cache memory 718-2 has a set full status. For example, if the global full signal GLOBAL_FULL has a logic level of "1", at least one of the sets constituting the cache memory 718-2 may have a set full status. In contrast, if the global full signal GLOBAL_FULL has a logic level of "0", none of the sets constituting the cache memory 718-2 may have a set full status. That is, if the global full signal GLOBAL_FULL has a logic level of "0", the caching operations for all of the sets constituting the cache memory may be available. The host queue managing logic unit 716 may receive the global full signal GLOBAL_FULL from the cache controller 718-4 to discriminate whether the cache set status list 714 is checked while the host data are transmitted. For example, if the global full signal GLOBAL_FULL having a logic level of "1" is transmitted to the host queue managing logic unit 716, the host queue managing logic unit 716 may check logic levels of the status bits stored in the cache set status list 714 while the host data are transmitted and may then determine transmission or non-transmission of the host data. In contrast, if the global full signal GLOBAL_FULL having a logic level of "0" is transmitted to the host queue managing logic unit 716, the host queue managing logic unit 716 may control the host queue 712 such that the host queue 712 immediately transmits the host data to the cache controller 718-4 without checking the logic levels of the status bits stored in the cache set status list 714 while the host data are transmitted.

The cache controller 718-4 of the cache system 718 may check the statuses of the sets constituting the cache memory 718-2 to transmit the global full signal GLOBAL_FULL to the host queue managing logic unit 716. In an embodiment, the cache controller 718-4 may grant a value (i.e., a logic level) of "0" or "1" to the status bits according to the statuses of the sets after checking the statuses of all of the sets included in the cache memory 718-2. A value of "1" may be assigned to the sets having a set full status, and a value of "0" may be assigned to the sets having a non-set full status (e.g., a set available status). Subsequently, after a logical "OR" operation for the granted values of the status bits is performed, the result of the logical "OR" operation may be transmitted to the host queue managing logic unit 716 the global full signal GLOBAL_FULL. Thus, if at least one of the sets constituting the cache memory 718-2 has the set full status, at least one of the granted values of the status bits may also have a value of "1" and the global full signal GLOBAL_FULL may be transmitted with a value of "1". In an embodiment, the global full signal GLOBAL_FULL may be periodically transmitted from the cache controller 718-4 to the host queue managing logic unit 716. Alternatively, the global full signal GLOBAL_FULL may be transmitted from the cache controller 718-4 to the host queue managing logic unit 716 according to a request of the host queue managing logic unit 716.

The embodiments of the disclosed technology have been disclosed above for illustrative purposes. Those of ordinary skill in the art will appreciate that various modifications, additions, and substitutions are possible. While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A memory system comprising:
   a host controller comprising a host queue, wherein the host queue is configured to store host data received from a host, and wherein the host data comprises commands; and
   a cache system comprising a cache memory and a cache controller, wherein the cache controller is configured to control an operation of the cache memory, and wherein the cache memory comprises a plurality of sets,
   wherein the cache controller is further configured to transmit, to the host controller, first status information on a first set, of the plurality of sets, to which first host data, of the host data, are to be transmitted,
   wherein the host controller is configured to receive the first status information from the cache controller and to determine, based on the first status information, whether to transmit the first host data stored in the host queue to the cache system,
   wherein the cache memory, having a set associative cache architecture, further comprises a plurality of ways, wherein each way of the plurality of ways comprises a plurality of blocks, wherein each set of the plurality of sets comprises a single block from each way, and
   wherein the cache controller is further configured to output to the host controller information on a status of a set, of the plurality of sets, to which second host data, of the host data, is to be cached, wherein the information comprises a proceed signal when the set to which the second host data is to be cached is available, and wherein the information comprises a hold signal when the set to which the second host data is to be cached is unavailable.

2. The memory system of claim 1, wherein the host data comprises:
   second host data comprising:
      write data;
      a write command for performing a write operation of writing the write data to a memory; and
      a second set address for a second set, of the plurality of sets in the cache memory, where the write data are to be written; and
   third host data comprising:
      a read command for performing a read operation of reading read data from the memory; and
      a third set address for a third set, of the plurality of sets in the cache memory, where read data are stored.

3. The memory system of claim 1, wherein the host controller is configured to store the host data in sequentially arranged storage elements of the host queue in an order in which the host data is outputted from the host.

4. The memory system of claim 1,
   wherein the cache memory further comprises a plurality of ways, wherein each way comprises a plurality of blocks; and
   wherein the cache memory is configured to have a set associative cache architecture such that each block included in any way of the plurality of ways belongs to a different set of the plurality of sets.

5. The memory system of claim 1, wherein the cache controller is further configured to generate the information in response to a request signal received from the host controller.

6. The memory system of claim 1, wherein the host controller is further configured to transmit the second host data to the cache controller when the information comprises the proceed signal and to interrupt transmission of the second host data to the cache controller when the information comprises the hold signal.

7. The memory system of claim 1 further comprising a plurality of transmission lines coupled between the host controller and the cache controller,
   wherein the cache memory, having a set associative cache architecture, further comprises a plurality of ways, wherein each way of the plurality of ways comprises a plurality of blocks, wherein each set of the plurality of sets comprises a single block from each way,
   wherein the cache controller is further configured to output a full flag signal to the host controller through a transmission line of the plurality of transmission lines, wherein the full flag signal has a first value when a set of the plurality of sets has a set full status and has a second value when the set has a set available status.

8. The memory system of claim 7, wherein the number of transmission lines in the plurality of transmission lines is equal to the number of sets in the plurality of sets.

9. The memory system of claim 7, wherein the cache controller is further configured to at least one of:
generate the full flag signal and output the full flag signal to the host controller periodically,
generate the full flag signal and output the full flag signal to the host controller in response to a request received from the host controller.

10. The memory system of claim 7, wherein the host controller is further configured to transmit the first host data to the cache system when the full flag signal has the second value and to interrupt transmission of the first host data when the full flag signal has the first value.

11. The memory system of claim 1,
wherein the cache memory, having a set associative cache architecture, further comprises a plurality of ways, wherein each way of the plurality of ways comprises a plurality of blocks, wherein each set of the plurality of sets comprises a single block from each way; and
wherein the host controller further comprises a plurality of storage elements used in generating a cache set status list including status information on the plurality of sets of the cache memory.

12. The memory system of claim 11, wherein each of the plurality of storage elements comprises:
a first storage region configured to store a set addresses of an associated set of the plurality of sets of the cache memory; and
a second storage region configured to store a value of a status bit for the associated set,
wherein the status bit having a first value indicates availability of a caching operation for the associated set, and
wherein the status bit having a second value indicates unavailability of the caching operation for the associated set.

13. The memory system of claim 12,
wherein the cache controller is further configured to output a set available signal and a set address for the associated set as information on a status of the associated set when the status of the associated set is changed into a status of the caching operation being available; and
wherein the cache controller is further configured to output a set full signal and the set address for the associated set as the information on the status of the associated set when the status of the associated set is changed into a status of the caching operation being unavailable.

14. The memory system of claim 13,
wherein the host controller is further configured to change the value of the status bit for the associated set from the second value into the first value when the set available signal and the set address for the associated set are outputted from the cache controller, and
wherein the host controller is further configured to change the value of the status bit for the associated set from the first value into the second value when the set full signal and the set address for the associated set are outputted from the cache controller.

15. The memory system of claim 12,
wherein the cache controller is further configured to output a global full signal to the host controller, and
wherein the global full signal indicates that at least one set of the plurality of sets has a set full status.

16. The memory system of claim 15,
wherein the cache controller is further configured to assign a value of "1" to status bits associated with sets having a set full status and assigns a value of "0" to status bits associated with sets having a non-set full status, and
wherein the cache controller is further configured to perform a logical "OR" operation of the values of the status bits of all of the sets and to output the result of the logical "OR" operation as the global full signal.

17. The memory system of claim 16,
wherein the host controller is further configured to check the cache set status list to determine whether to transmit the host data when the global full signal having a value of "1" is inputted to the host controller; and
wherein the host controller is further configured to transmit the host data to the cache system without checking the cache set status list when the global full signal having a value of "0" is inputted to the host controller or the global full signal is not inputted to the host controller.

18. The memory system of claim 17,
wherein the host controller is further configured to transmit the host data to the cache controller when the global full signal is inputted to the host controller and the status bit of the cache set status list has a first value; and
wherein the host controller is further configured to transmit next host data to the cache controller when the global full signal is inputted to the host controller and the status bit of the cache set status list has the second value.

* * * * *